United States Patent
Gotoh et al.

(10) Patent No.: US 10,168,215 B2
(45) Date of Patent: Jan. 1, 2019

(54) COLOR MEASUREMENT APPARATUS AND COLOR INFORMATION PROCESSING APPARATUS

(71) Applicants: Takayuki Gotoh, Kanagawa (JP); Takuroh Sone, Kanagawa (JP); Akihiro Iwamatsu, Ibaraki (JP); Hideyuki Kihara, Kanagawa (JP); Takashi Soma, Kanagawa (JP); Shuhei Watanabe, Chiba (JP)

(72) Inventors: Takayuki Gotoh, Kanagawa (JP); Takuroh Sone, Kanagawa (JP); Akihiro Iwamatsu, Ibaraki (JP); Hideyuki Kihara, Kanagawa (JP); Takashi Soma, Kanagawa (JP); Shuhei Watanabe, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/911,197

(22) Filed: Mar. 5, 2018

(65) Prior Publication Data

US 2018/0259394 A1    Sep. 13, 2018

(30) Foreign Application Priority Data

Mar. 9, 2017 (JP) ................. 2017-045300

(51) Int. Cl.
| | |
|---|---|
| G01N 21/25 | (2006.01) |
| G01J 3/50 | (2006.01) |
| G01J 3/06 | (2006.01) |
| G01J 3/02 | (2006.01) |
| G01J 3/46 | (2006.01) |

(52) U.S. Cl.
CPC ............. G01J 3/50 (2013.01); G01J 3/021 (2013.01); G01J 3/0297 (2013.01); G01J 3/06 (2013.01); *G01J 2003/467* (2013.01)

(58) Field of Classification Search
CPC ........ G01J 3/46; G01J 3/51; G01J 1/36; G01J 2003/466; G01N 21/251
USPC ........................................... 356/408
See application file for complete search history.

(56) References Cited

U.S. PATENT DOCUMENTS

2015/0326771 A1    11/2015    Maruyama et al.
2017/0270655 A1    9/2017    Watanabe et al.

FOREIGN PATENT DOCUMENTS

| JP | 10-281874 | 10/1998 |
|---|---|---|
| JP | 2009-014373 | 1/2009 |
| JP | 2015-228641 | 12/2015 |
| JP | 2016-038221 | 3/2016 |

*Primary Examiner* — Md M Rahman
(74) *Attorney, Agent, or Firm* — Oblon, McClelland, Maier & Neustadt, L.L.P.

(57) ABSTRACT

A color measurement apparatus includes at least one illuminator, an imager, and circuitry. The circuitry is configured to normalize each pixel included in an imaging region of one of the spectral reflectance images of the measurement target irradiated with light at a specific illumination angle of the plurality of illumination angles, with one of the spectral reflectance images of the reference object irradiated with light at the specific illumination angle, for each of the plurality of illumination angles so as to generate normalized spectral reflectance images of the measurement target. The circuitry further calculates a numerical value of at least one color for each pixel of the normalized spectral reflectance images of the measurement target, for respective ones of the plurality of illumination angles, to measure color of the surface of the measurement target.

17 Claims, 21 Drawing Sheets

FIG. 1A
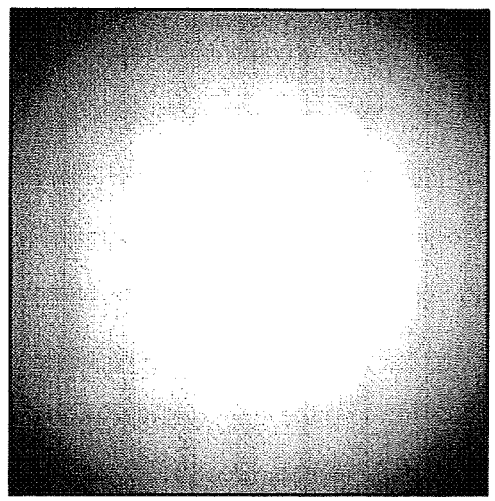
LUMINANCE
$\alpha_1$
FIG. 1B
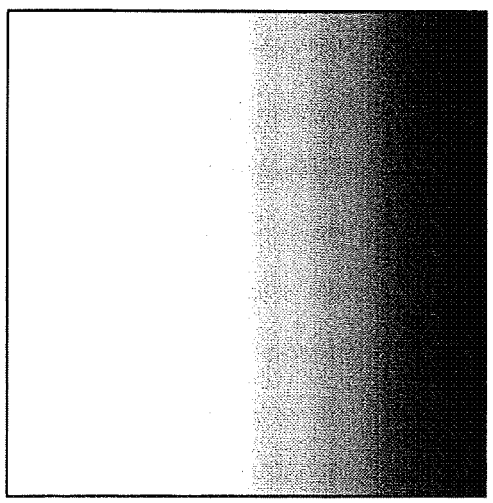
LUMINANCE
$\alpha_2$

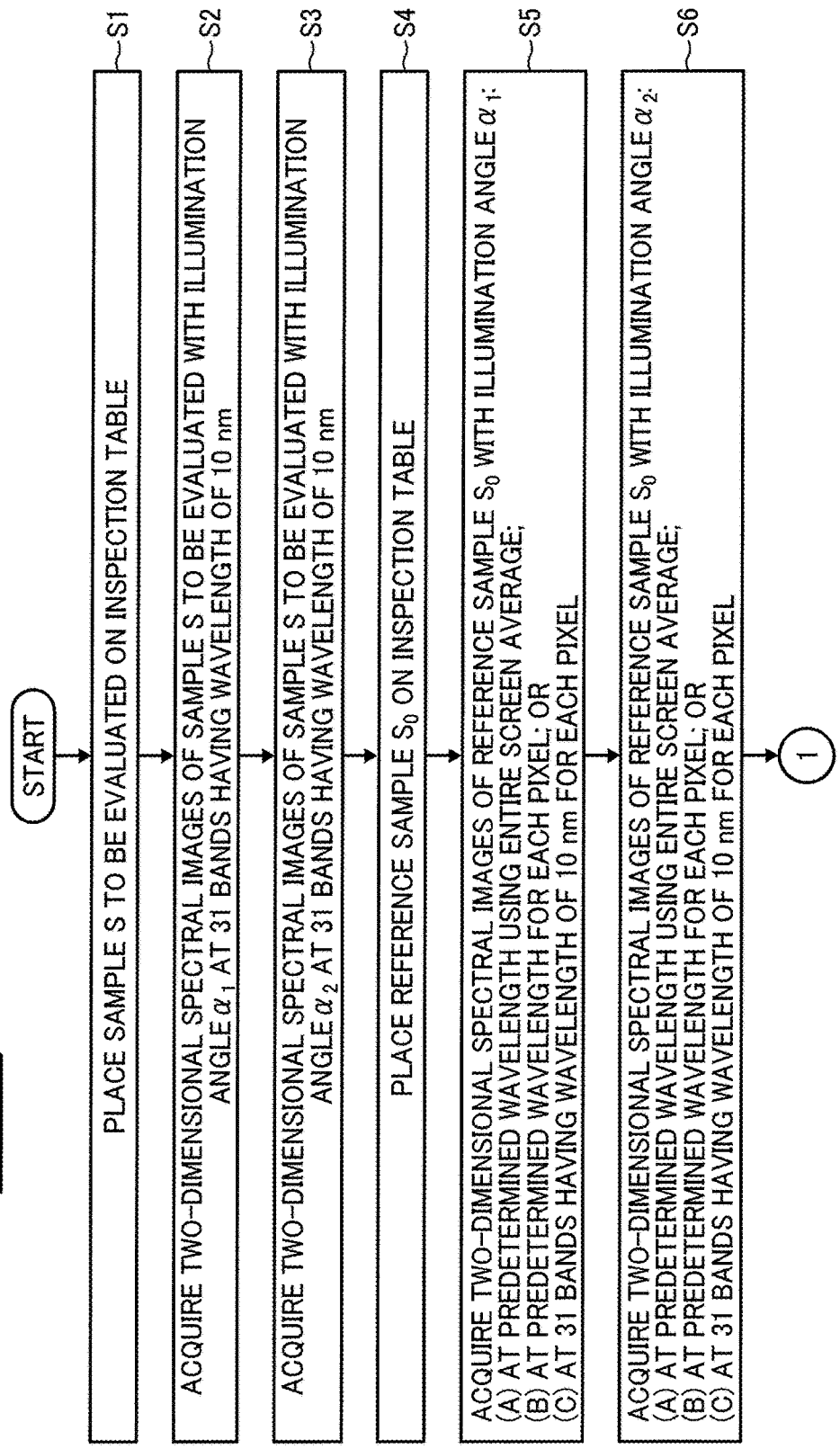

FIG. 7
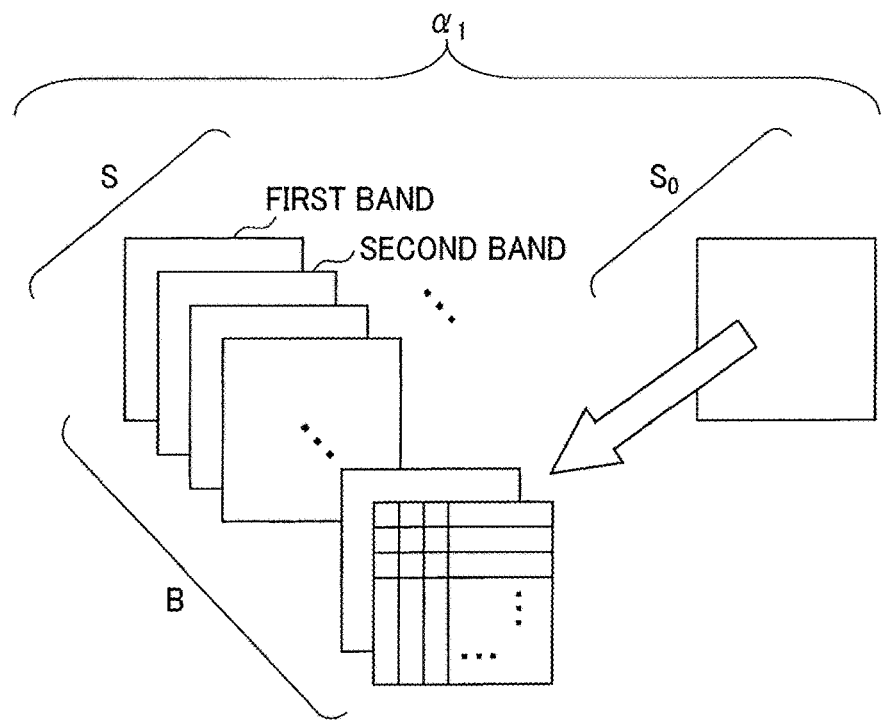
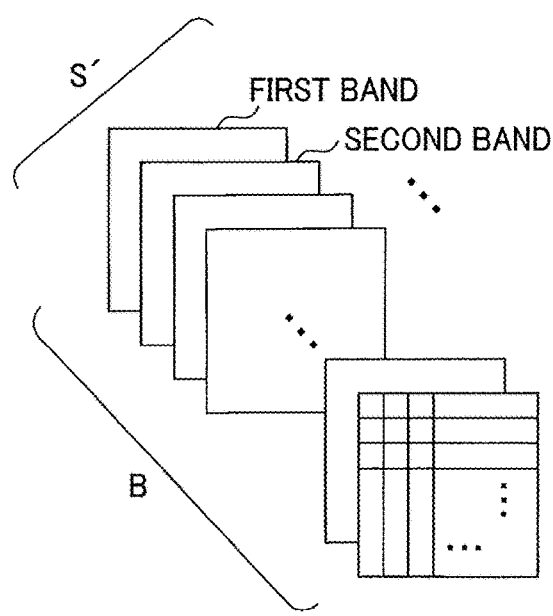

FIG. 8
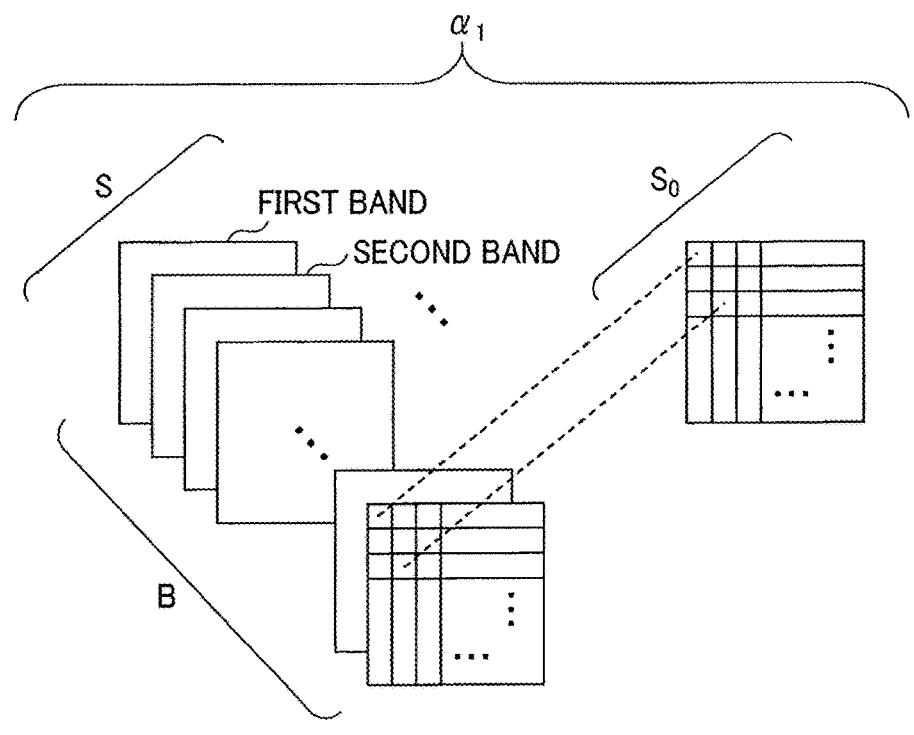
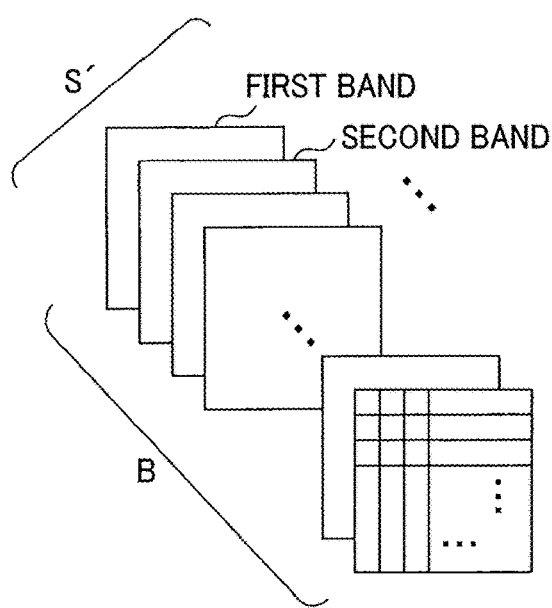

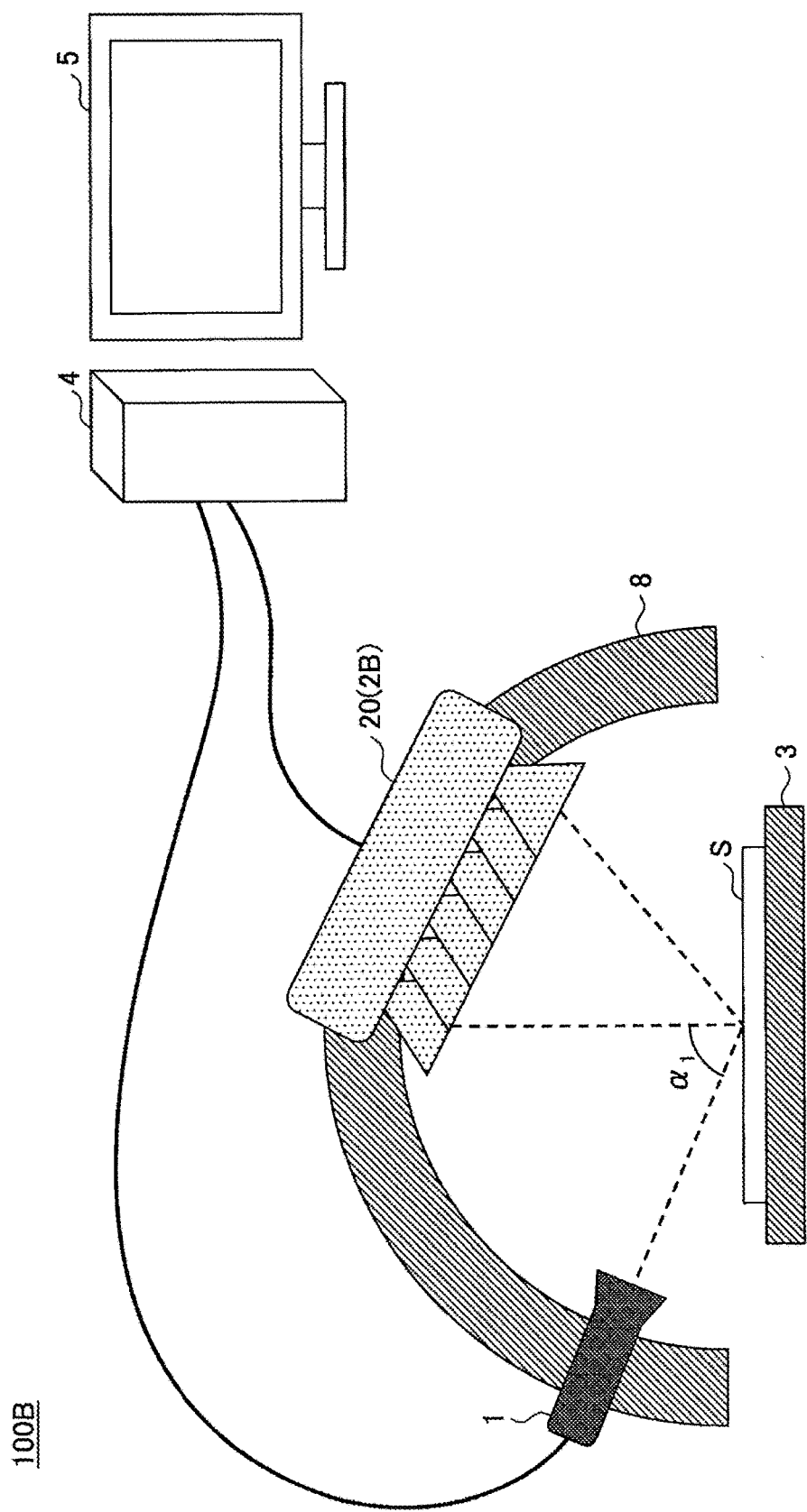

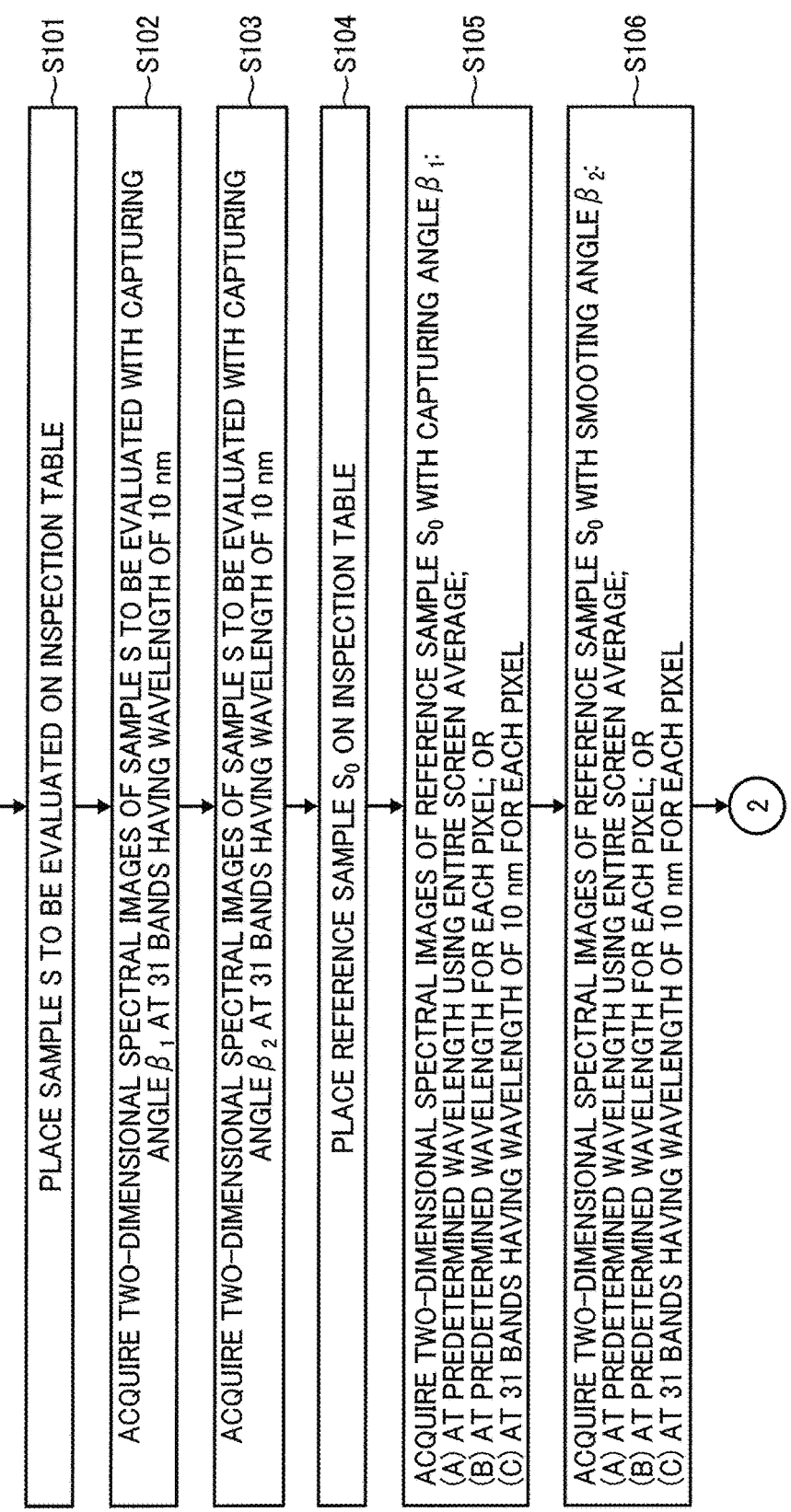

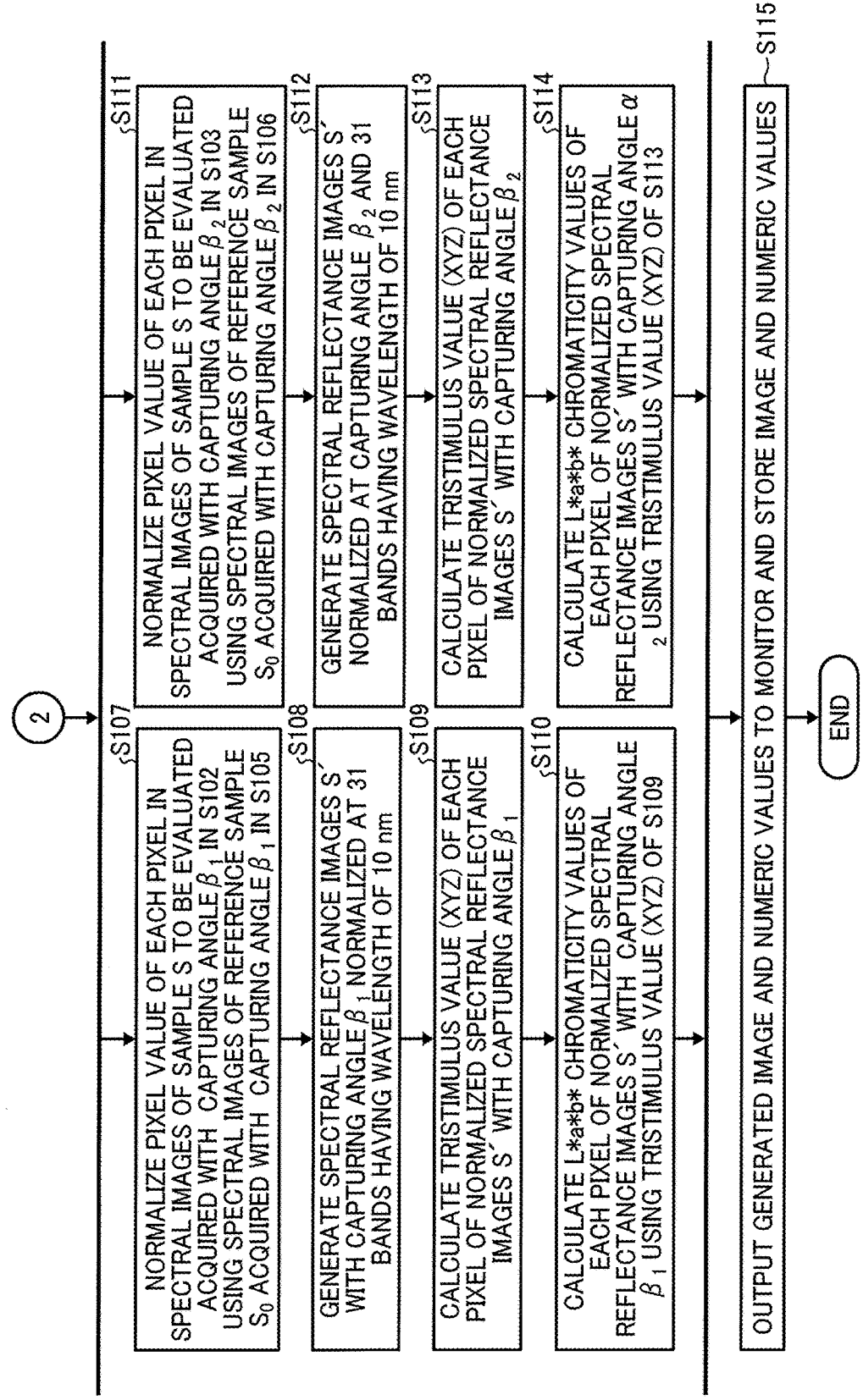

COLOR MEASUREMENT APPARATUS AND COLOR INFORMATION PROCESSING APPARATUS

CROSS-REFERENCE TO RELATED APPLICATIONS

This patent application is based on and claims priority pursuant to 35 U.S.C. § 119(a) to Japanese Patent Application No. 2017-045300, filed on Mar. 9, 2017, in the Japan Patent Office, the entire disclosure of which is hereby incorporated by reference herein.

BACKGROUND

Technical Field

The present disclosure relates to a color measurement apparatus and a color information processing apparatus that measure a color of a measurement target.

Background Art

Recently, exterior painting is one of important factors directly linked to attractiveness of products, in particular, relating to industrial products for end users. Management of painting qualities of these products or evaluation of how the painting looks to human eyes is an important item in order to improve the quality control of industrial products and the attractiveness of products.

In general, it is already known a method for using a colorimeter with L*a*b* values measured at a plurality of illumination angles as management items when managing painting quality, and managing the quality of a look based on whether the measured L*a*b* values exist within certain ranges with respect to predetermined values.

SUMMARY

A color measurement apparatus includes at least one illuminator, an imager, and circuitry. At least one illuminator is configured to irradiate surfaces of a measurement target and a reference object with light at a plurality of illumination angles. The imager is configured to image the surface of the measurement target at a predetermined capturing angle, at one illumination angle per imaging, to acquire spectral reflectance images of the measurement target at the plurality of illumination angles, and image the surface of the reference object at the predetermined capturing angle, at the plurality of illumination angles, respectively, to acquire spectral reflectance images of the reference object at the plurality of illumination angles. The circuitry is configured to normalize each pixel included in an imaging region of one of the spectral reflectance images of the measurement target irradiated with light at a specific illumination angle of the plurality of illumination angles, with one of the spectral reflectance images of the reference object irradiated with light at the specific illumination angle, for each of the plurality of illumination angles so as to generate normalized spectral reflectance images of the measurement target. The circuitry further calculates a numerical value of at least one color for each pixel of the normalized spectral reflectance images of the measurement target, for respective ones of the plurality of illumination angles, to measure color of the surface of the measurement target.

A color measurement apparatus includes an illuminator, at least one imager, and circuitry. The illuminator is configured to irradiate surfaces of a measurement target and a reference object with light at a predetermined illumination angle. At least one imager is configured to image the surface of the measurement target at a plurality of capturing angles to acquire spectral reflectance images of the measurement target, and image the surface of the reference object at the plurality of capturing angles, at the predetermined illumination angle, to acquire spectral reflectance images of the reference object at the plurality of capturing angles. The circuitry is configured to normalize each pixel included in an imaging region of one of the spectral reflectance images of the measurement target captured at a specific capturing angle of the plurality of capturing angles, with one of the spectral reflectance images of the reference object captured at the specific capturing angle, for each of the plurality of capturing angles so as to generate normalized spectral reflectance images of the measurement target. The circuitry further calculates a numerical value of at least one color for each pixel of the normalized spectral reflectance images of the measurement target for respective ones of the plurality of capturing angles, to measure color of the surface of the measurement target.

A color information processing apparatus includes a memory and circuitry. The circuitry inputs, to the memory, spectral reflectance images of a measurement target acquired at a plurality of predetermined illumination angles and spectral reflectance images of a reference object acquired at the plurality of predetermined angles, normalizes the spectral reflectance images of the measurement target acquired at the predetermined illumination angles using the spectral reflectance images of the reference object acquired at the same illumination angles, at each of the illumination angles, to generate normalized spectral reflectance images of the measurement target; and calculates a numerical value of at least one color for each pixel of the normalized spectral reflectance images of the measurement target at the respective illumination angles.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 1A and 1B are examples of luminance unevenness caused by illumination;

FIGS. 6A and 6B are illustrations of a flowchart of measurement in the color measurement apparatus of the first embodiment;

FIG. 7 is an example of a two-dimensional spectral image obtained by normalizing each pixel at each wavelength of a two-dimensional spectral image of a sample to be evaluated with an average value of the entire screen of a reference sample;

FIG. 8 is an example of a two-dimensional spectral image obtained by normalizing each pixel of each wavelength of the two-dimensional spectral image of the sample to be evaluated with the same pixel value for each pixel of the reference sample at a predetermined wavelength;

FIGS. 10A to 10C illustrate examples of an L* image (luminance image) measured by capturing a painted surface containing aluminum flakes as a sample to be evaluated under a plurality of conditions, in which FIG. 10A is an L* image which is obtained by normalizing a spectral image of the sample to be evaluated measured at a certain illumination angle based on a pixel value of a reference sample measured at another illumination angle, FIG. 10B is an L* image obtained by normalization using the technique of FIG. 7, and FIG. 10C is an L* image obtained by normalization using the technique of FIG. 9;

FIG. 12 is an overall schematic view of the color measurement apparatus according to the second embodiment of the present disclosure;

FIGS. 13A and 13B are illustration of a flowchart of measurement in the color measurement apparatus of the second embodiment;

Figure 2:
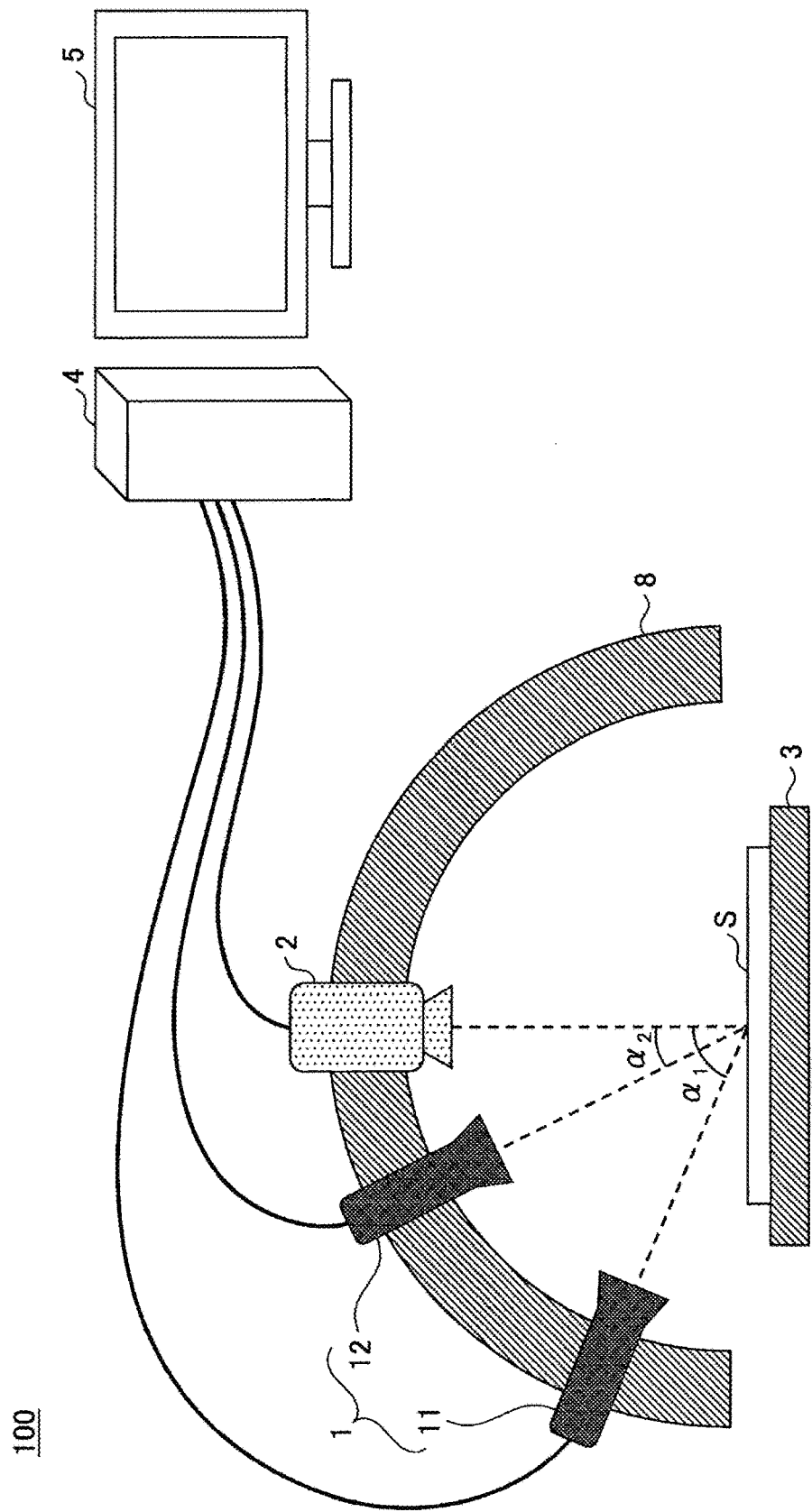
FIG. 2 is an overall schematic view of a color measurement apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, modes for carrying out the present disclosure will be described referring to the drawings. Hereinafter, the same components will be denoted by the same reference numerals in the respective drawings, and redundant descriptions will be omitted in some cases.

In typical colorimeters that have been used so far, average chromaticity of a narrow dot-like region (for example, a circular region having a diameter of several mm) is measured, and thus, it has been difficult to calculate (evaluate) a measurement value in conformity with visual impression for a sample whose pattern and texture vary depending on a location. Accordingly, an image having a predetermined two-dimensional area is preferably acquired and a color within such a range is accurately measured in order to manage the painting quality.

To allow measuring the predetermined area, a spectral image is preferably measured with a camera or the like, which increases a measurement range in the case of image measurement. Accordingly, luminance unevenness of illumination occurs in an image region within the sample to be evaluated depending on an illumination angle. For example, FIGS. 1A and 1B illustrate examples of luminance unevenness. FIG. 1A illustrates an example of luminance unevenness when an illumination is provided at a center portion and light is emitted toward an image center portion, and FIG. 1B illustrates an example of luminance unevenness when the illumination is provided on the left side of the drawing and light is emitted from the side. In this manner, the luminance unevenness exists in a region depending on the illumination, and further, the distribution of such luminance unevenness varies depending on a change of the illumination angle.

Thus, it is difficult to measure an accurate color of the sample (measurement target) with only one illumination angle. To handle such circumstances, a color measurement apparatus according to a comparative example has a configuration that obtains a spectral reflectance when an object to be evaluated is illuminated at a plurality of illumination angles to calculate a color value of the object to be evaluated, so as to quantitatively evaluate a color of a sample in conformity with the visual impression to the human eyes.

In such a color measurement apparatus according to the comparative example, however, a plurality of illuminators arranged in a circular pattern illuminates a sample at a plurality of illumination angles, which restricts a measurement target to a thin material with a small area. This makes it difficult to obtain a measurement value in conformity of the visual impression to the human eyes, with respect to a sample having, for example, a pattern.

Further, such a color measurement apparatus according to the comparative example might cause the fluctuations in measurement values due to the luminance unevenness of the illumination caused by performing the measurement with the plural illumination angles, which is attributed to unevenness in the characteristics of the illumination.

To handle the above-described circumstances, the present inventors have conceived of a color measurement apparatus that enables measuring color information of a measurement target having high correlation with the look according to at least one embodiment of the present disclosure as described below.

[First Embodiment]

A configuration of a color measurement apparatus according to a first embodiment of the present disclosure will be described referring to FIGS. 2 to 5. FIG. 2 is an overall schematic view of a color measurement apparatus 100 according to the first embodiment of the present disclosure.

Figure 3:
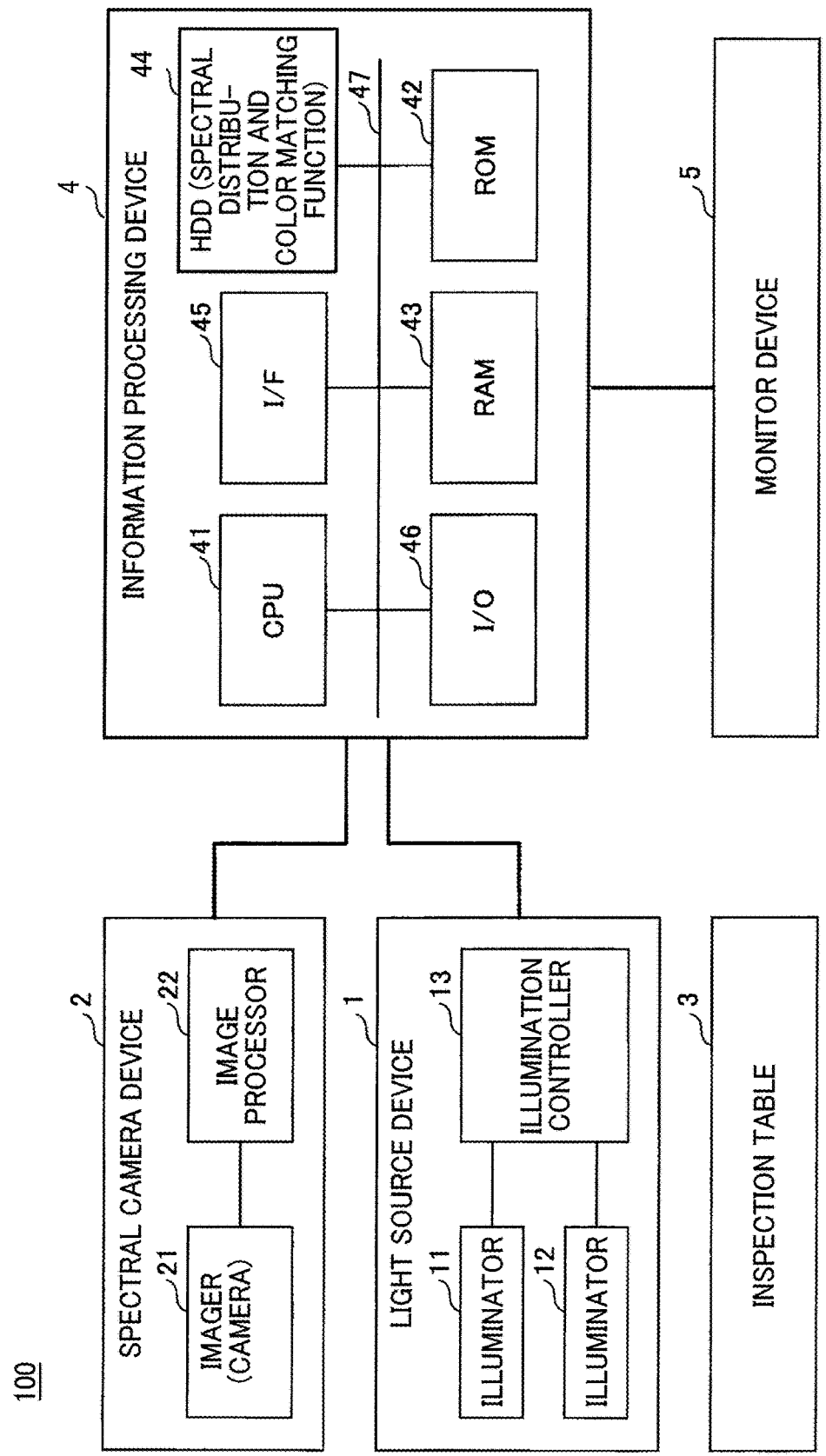
FIG. 3 is a hardware block diagram of the color measurement apparatus of the first embodiment.

FIG. 3 is a block diagram of the color measurement apparatus 100 according to the first embodiment.

The color measurement apparatus 100 according to the present embodiment includes a light source device 1, an imaging device 2, an inspection table 3, an information processing device 4, and a monitor device 5 as illustrated in FIGS. 2 and 3.

The light source device 1 includes two illuminators 11 and 12 so as to emit light at least two or more illumination angles with respect to a sample S to be evaluated or a reference sample $S_0$ placed on the inspection table 3 in the present embodiment.

The imaging device (image capturing device) 2 has a camera 21, which captures images of the sample S to be evaluated and the reference sample $S_0$ placed on the inspection table 3 to acquire spectral reflectance images. The illuminators 11 and 12 and the camera 21 are supported by an arc-shaped base plate 8 in the present embodiment.

The imaging device 2 is capable of imaging a surface of the sample to be evaluated or the reference sample having, for example, about several tens mm×several tens mm (for example, 50 mm×50 mm), as a measurement size, at a time.

The information processing device 4 has a function of a color calculator that normalizes a spectral image and calculates information on a color of the image. In FIG. 2, the information processing device 4 is provided apart from the illuminator and an image capturing unit for schematic illustration, but the function of the color calculator performed by the information processing device 4 may be provided inside a housing, integrated with the illuminator and the image capturing unit, as a device.

Alternatively, the function of the information processing device 4 operating as the color calculator may be executed by a calculation device (color information processing apparatus) such as a separate computer completely independent from the illuminator and the image capturing unit.

The monitor device 5 displays the calculated spectral image and the information on the color of the image.

Specifically, a general light source, such as an incandescent light bulb, a fluorescent lamp, a light emitting diode (LED) illumination, and a halogen light source can be used for the illuminators 11 and 12. The above-described illumination is used in combination with a telecentric lens to emit parallel light, to perform measurement with high accuracy.

It is possible to shed light to the sample to be evaluated from at least two or more illumination angles since the plurality of illuminations (the illuminators 11 and 12) is provided in the present embodiment. Although it is possible to emit light from the two illumination angles, light is not emitted from two directions at a time but emitted at one illumination angle per imaging.

Referring to FIG. 3, the light source device 1 includes the first illuminator 11 and the second illuminator 12 as a plurality of illuminators, and an illumination controller 13 that drives lighting of the illuminators 11 and 12. Although FIG. 3 illustrates the case where the single illumination controller 13 is commonly used, illumination controllers may be provided, respectively, for the illuminators 11 and 12.

The camera 21 employs a camera that is capable of acquiring two-dimensional spectral information in a wavelength band corresponding to a visible light region. It is possible to use a multispectral camera capable of obtaining spectral information in a plurality of bands and a hyperspectral camera capable of acquiring spectral information with high wavelength resolution.

The imaging device 2 (a spectral camera device) includes the single imager (camera) 21 and an image processor 22, and acquires images with a one-time imaging operation (one shot) corresponding to each of the two irradiation angles (illumination angles) of the illuminators 11 and 12 of the light source device 1 fixed at each angle.

As the information processing device 4, a general computer device can be used. Specifically, the computer device may be a dedicated device in the color measurement apparatus of the present application, or an external computer may be used for color calculation by reading a color measurement program.

Referring to FIG. 3, the information processing device 4 includes a central processing unit (CPU) 41, a read only memory (ROM) 42, a random access memory (RAM) 43, and a hard disk drive (HDD) 44. Further, the information processing device 4 includes various interfaces (I/F) 45, an I/O controller, and an input/output interface (I/O) 46. These hardware elements, from the CPU 41 to the I/O 46, are coupled to each other via a bus line 48.

The HDD 44 stores the color measurement program to perform calculations corresponding to each measurement item of a sample by using the acquired spectral information together with imaging control of the imaging device 2, light source lighting control of the light source device 1, projection control of a projection pattern of a projector, in order to measure a color (texture) of a surface of a measurement target.

As the monitor device 5, for example, a liquid crystal monitor device can be used. On the monitor device 5, not only a setting menu and an operation menu but also an intensity histogram of a luster parameter or the like corresponding to each irradiation angle of light can be displayed.

The monitor device 5 can display spectral reflectance images before and after normalization, numerical values relating to colors during calculation and after calculation, and various graphs and images for reference that can be created from each numerical value, and the like.

For example, the monitor device 5 may display a spectral reflectance graph for each normalized pixel, a two-dimensional distribution chart based on the spectral reflectance, a chromaticity diagram corresponding to tristimulus values (XYZ), coordinate positions on a L*a*b* color space based on L*a*b* values, a simulation example of an appearance of a color under each prescribed light source based on L*a*b* color values, and the like as the graphs and images for reference.

FIG. 2 illustrates a configuration in which the illuminator and the imager are provided at the upper side and a detection table including the sample to be evaluated is placed at the lower side. However, the illuminator and the imager may be arranged on the side and the surface of the sample to be evaluated may also be arranged to erect (vertically) on the side as long as the sample to be evaluated can be fixed.

Figure 4:
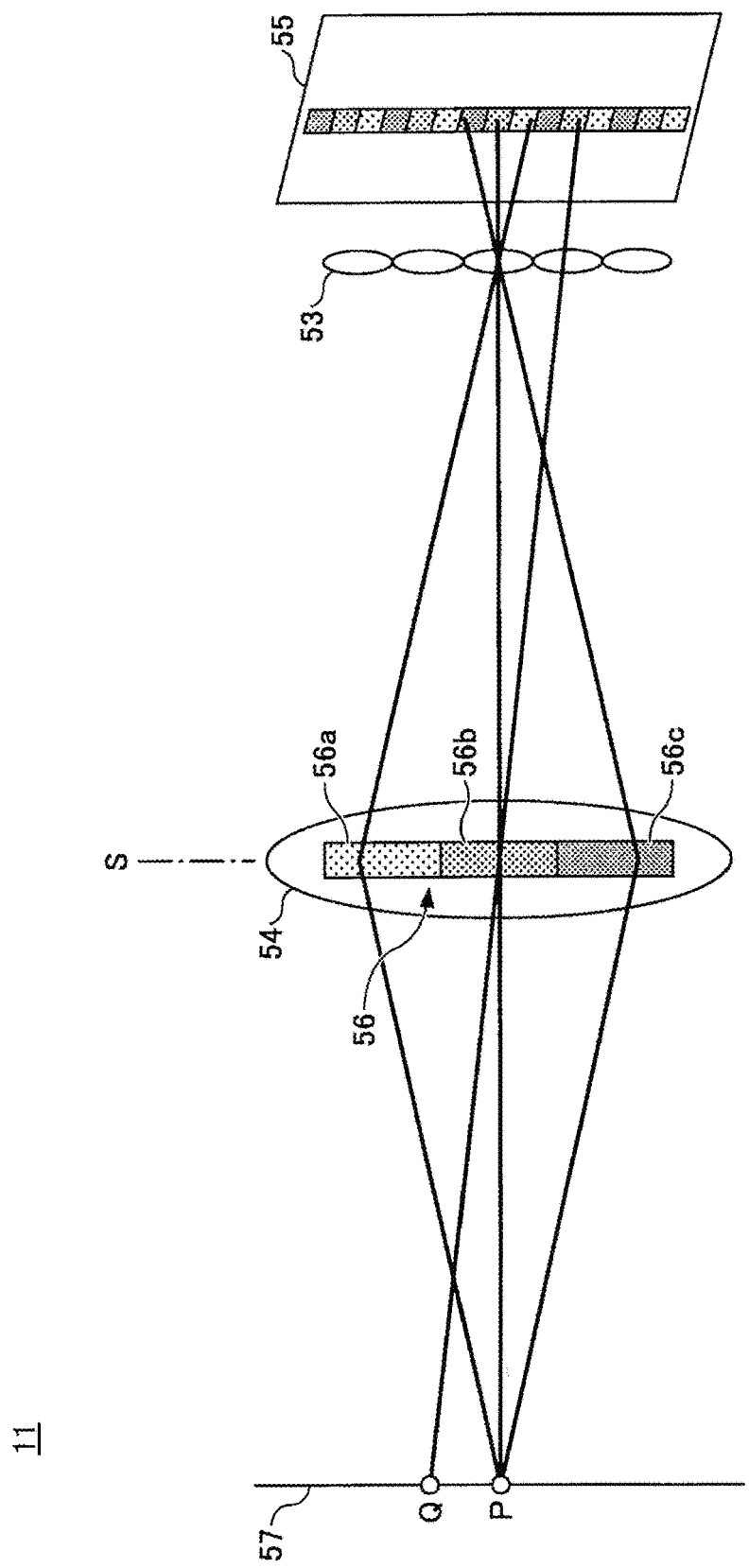
FIG. 4 is a structural view of a main part of a spectral camera used in the color measurement apparatus according to an embodiment of the present disclosure.

Next, an overview of spectrography of the spectral camera used as the imager 21 will be described using FIG. 4. FIG. 4 is a structural view of a main part of the imager (spectral camera) 21 used in the color measurement apparatus according to the embodiment of the present disclosure. Although the spectral camera 21 in FIG. 4 is illustrated as an example of a multispectral camera including a set of filters and a diffraction grating, a spectral camera device forming the imager 21 may employ a hyperspectral camera device including one or more sets of filters and a diffraction grating (or a prism).

In the spectral camera 21, spectral information corresponding to the number of spectral filters is acquired for each microlens by a microlens array that is inserted, as a spectral information acquisition unit that acquires two-dimensional spectral information, among a spectral filter group inserted in a main lens, the main lens, and a light receiving element.

Figure 5:
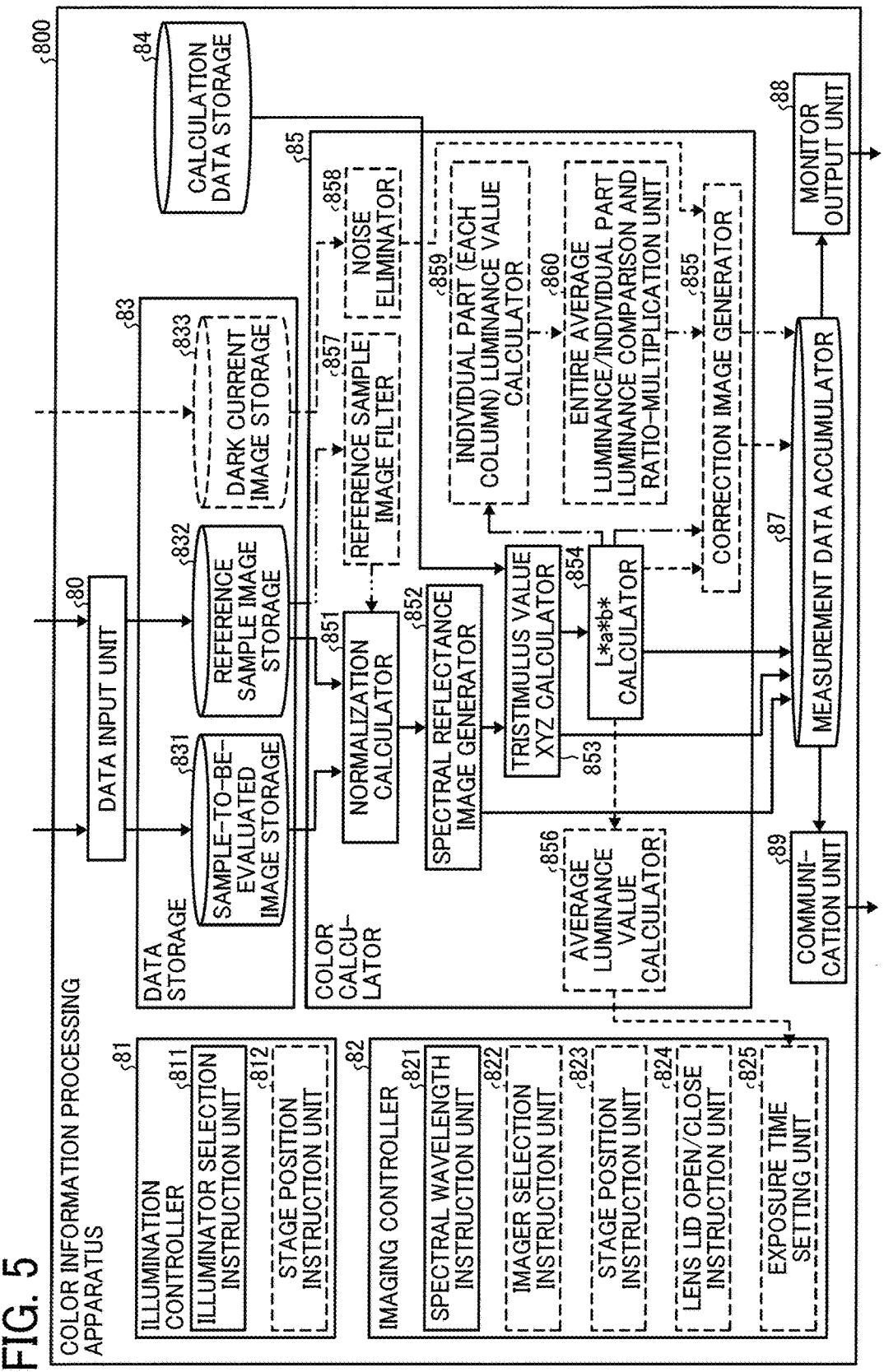
FIG. 5 is a functional block diagram of an information processing device of a color measurement apparatus according to an embodiment of the present disclosure.

In FIG. 4, a main lens 54 as an optical system is illustrated as a single lens, and an aperture position S of the main lens 54 is illustrated as the center of a single lens. However, a color filter 56 is not practically positioned inside the lens as illustrated in FIG. 5. The color filter 56 is arranged in the vicinity of an aperture of the main lens 54. The "vicinity of the aperture" means a part through which light rays with various angles of view can pass including the aperture position. In other words, the "vicinity of the aperture" means an allowable range on the design of the color filter 56 with respect to the main lens 54.

In FIG. 4, the color filter 56 as an optical band-pass filter is arranged at the center of the main lens 54. The color filter 56 is a filter corresponding to tristimulus values of a color having a spectral transmittance based on a color matching function of a XYZ color system. That is, the color filter 56 includes a plurality (three here) of color filters 56a, 56b, and 56c having different spectral transmittances based on the color matching functions of the XYZ color system.

Such an optical band-pass filter may be configured by combining a plurality of filters having different spectral transmittances or may be configured such that spectral transmittances differ for each region on a single filter.

With the above configuration, for example, when 31 types of optical band-pass filters, which have transmission wavelength peaks in increments of 10 nm in a wavelength range of 380 nm to 780 nm, are used, it is possible to acquire spectral information in the wavelength range of 380 nm to 780 nm in increments of 10 nm.

In this manner, the spectral wavelength range that can be measured (can be captured) by the camera covers 380 nm to 780 nm to cover a visible light region of human. Accordingly, it is possible to acquire spectral information in conformity with a look to human eyes.

Although it is more preferable to classify the band more finely as described above, it is sufficient for the multispectral camera or the hyperspectral camera forming the imaging device to be capable of capturing spectral images of at least eight bands or more. As at least eight bands or more bands are secured, it is possible to acquire the sufficient spectral information in conformity with the look.

FIG. 5 is a functional block diagram of the information processing device of the color measurement apparatus according to the embodiment of the present disclosure. Functions used in the present embodiment are indicated by solid lines, and functions relating to configuration examples and control examples to be described later are indicated by dotted lines.

FIG. 5 illustrates the functional block diagram of the respective functions implemented as the CPU 41 operates according to the color measurement program.

The color measurement program may be provided in the form of being recorded in a recording medium readable by a computer device, such as a compact disc read only memory (CD-ROM) and a flexible disk (FD), in a file format of either an installable format or an executable format. Alternatively, the color measurement program may be provided in the form of being recorded in a recording medium readable by a computer device such as a CD-R, a digital versatile disk (DVD), a Blu-ray Disc (registered trademark), and a semiconductor memory. Alternatively, the color measurement program may be provided in the form to be installed via a network such as the Internet. Alternatively, the color measurement program may be provided in the form of being incorporated in a ROM or the like in the device in advance.

A color information processing apparatus 800 includes a data input unit 80, an illumination controller 81, an imaging controller 82, an imaging data storage 83 (a data storage), a calculation data storage 84, a color calculator 85, a measurement data accumulator 87, a monitor output unit 88, and a communication unit 89.

The CPU 41 illustrated in FIG. 3 implements the respective functions of the illumination controller 81, the imaging controller 82, and the color calculator 85 in FIG. 5 by software. Some or all of the illumination controller 81, the imaging controller 82, and the color calculator 85 may be implemented by hardware although the description will proceed as being implemented by software.

In addition, the imaging data storage 83, the calculation data storage 84, and the measurement data accumulator 87 are implemented by any of HDD, computer output microfilm (COM), and ROM, illustrated in FIG. 3, or an electrically erasable programmable read only memory (EE-PROM).

The data input unit 80, the monitor output unit 88, and the communication unit 89 are implemented by any of the various interfaces (I/F) 45, the I/O controller, and the input/output interface (I/O) 46.

Referring to FIG. 5, the illumination controller 81 includes either an illuminator selection instruction unit 811 or a stage position instruction unit 812. In the first embodiment, the illumination controller 81 causes the illuminator selection instruction unit 811 to instruct selection of the illuminator 11 or 12 to be used at the time of capturing an image.

The imaging controller 82 includes a spectral wavelength instruction unit to selectively use a wavelength selected by the above-described camera and capture an image in an executable manner.

The imaging controller 82 may include an imaging device selection instruction unit, a stage position instruction unit, a lens lid open/close instruction unit, an exposure time setting unit, and the like which are used in other embodiments or additional adjustment examples. Each function of the above-described units will be specifically described at the time of describing the below additional adjustment examples in detail. The same description applies to the following imaging data storage 83 and color calculator 85.

The imaging data storage 83 has functions of a sample-to-be-evaluated image storage 831 and a reference sample image storage 832 in order to store at least a captured image for adjustment.

The imaging data storage 83 may include a dark current image storage 833 used in other adjustment example.

The calculation data storage 84 stores data of an illumination observation condition, a spectral distribution, a color matching function, and the like which are referred to in calculation by the color calculator.

The color calculator 85 includes at least a normalization calculator 851, a spectral reflectance image generator 852, a tristimulus value XYZ calculator 853, and an L*a*b* calculator 854.

The normalization calculator (normalizer) 851 normalizes a spectral image of the sample to be evaluated with a predetermined illumination angle using a spectral image of the reference sample of the same illumination angle at each illumination angle.

The spectral reflectance image generator 852 generates a spectral reflectance image of the sample to be evaluated.

The normalization calculator 851 and the spectral reflectance image generator 852 function as the normalizer that normalizes each pixel included in an imaging region of a spectral reflectance image of the measurement target, irradiated with light at a specific illumination angle, using a spectral reflectance image of a reference object, irradiated with light at the same angle as the specific illumination angle, at each of a plurality of illumination angles, and generates a normalized spectral reflectance image (S) of the measurement target.

The tristimulus value XYZ calculator 853 calculates tristimulus values (XYZ), which are values obtained by quantifying a color, for each illumination angle based on spectral reflectance images for each pixel of the sample to be evaluated.

The L*a*b* calculator 854 calculates L*a*b* values, which are values obtained by quantifying a color, for each illumination angle based on a spectral reflectance image S' for each pixel and the tristimulus values (XYZ).

The tristimulus value XYZ calculator 853 and the L*a*b* calculator 854 function as a quantifying unit that calculates at least one value, obtained by quantifying the color, for each pixel of the normalized spectral reflectance image of the measurement target at each of the plurality of illumination angles.

In addition, the color calculator 85 may have functions of an average luminance value calculator 856, a correction image generator 855, a reference sample (image) filter 857, a noise eliminator 858, an individual part (each column) luminance value calculator 859, an entire average luminance/individual part luminance comparison and ratio-multiplication unit 860, which are used in the other embodiments and additional adjustment examples, in an implementable manner.

The measurement data accumulator 87 accumulates and stores the spectral reflectance image, the tristimulus values (XYZ) for each pixel, and the L*a*b* color values for each pixel which are calculated by the color calculator 85.

The monitor output unit 88 outputs measurement data in accordance with a display format on the monitor device 5.

The communication unit 89 transmits the measurement data to other device (for example, another information processing device) connected in a wired or wireless manner.

<Color Measurement Flow>

Figure 6B:
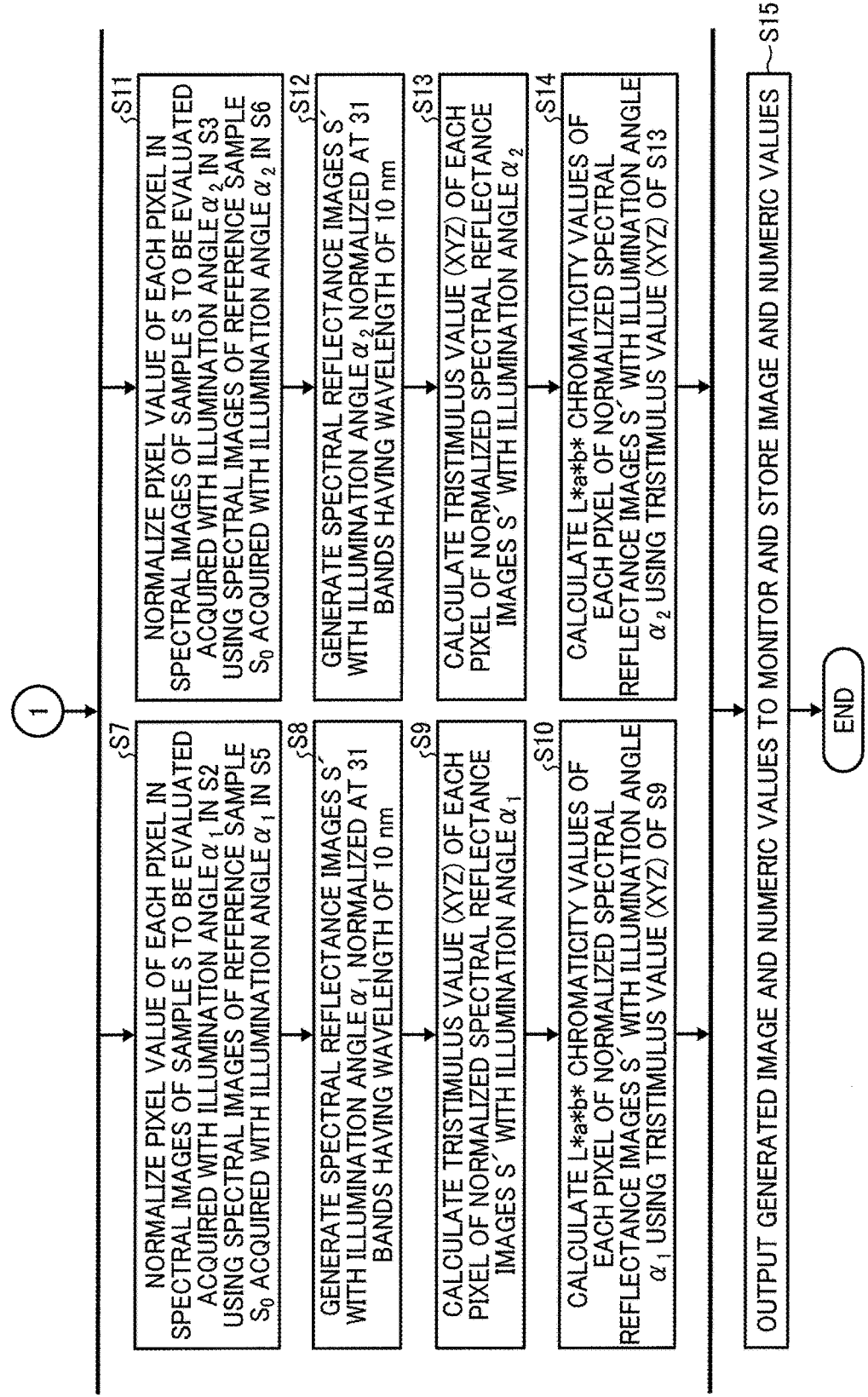

Next, a color measurement procedure according to the first embodiment will be described referring to FIGS. 5, 6A and 6B. FIGS. 6A and 6B are illustrations of a flowchart of color measurement in the color measurement apparatus of the first embodiment.

The flow of FIGS. 6A and 6B illustrate an example in which the plurality of illuminators 11 and 12 each of which includes a telecentric lens with a xenon light source is used to emit light as light sources, and imaging is performed by the single imager (spectral camera) 21.

In FIGS. 6A and 6B, in step S1, the camera 21 confirms whether the sample S to be evaluated is placed on the inspection table 3.

Next, in step S2, the spectral camera 21 captures and acquires two-dimensional spectral images of the sample S to be evaluated with an illumination angle α1 of light emitted from the illuminator 11 in B bands (31 bands (wavelength bands) in the above-described case) in increments of a predetermined number x nm (for example, 10 nm) in the visible light region (for example, 400 nm to 700 nm).

Here, the two-dimensional spectral image represents a two-dimensional distribution (an aggregate) of spectral reflectances for the respective pixels in the captured image, and is also referred to as a spectral image or a spectral reflectance image.

Subsequently, in step S3, the spectral camera 21 captures and acquires a two-dimensional spectral image of the sample S to be evaluated with an illumination angle α2 of light emitted from the illuminator 12 in the B bands in increments of the predetermined number X nm in the visible light region similarly to step S2.

In the case of performing measurement with three or more illumination angles, the same imager captures images for the sample S to be evaluated by changing the illumination angle in the same manner, thereby repeating the acquisition of the two-dimensional spectral image. When the acquisition of the two-dimensional spectral image of the sample S to be evaluated is completed, a type of the sample on the inspection table 3 is replaced.

In step S4, the spectral camera 21 confirms whether the reference sample $S_0$ is placed on the inspection table 3.

Here, the reference sample $S_0$, which is the reference object, is used for comparison as a reference with respect to the sample S to be measured which is the measurement target, and is required to correct a spectrum of irradiation light when converting an image into a spectral reflectance image in the subsequent stage. Thus, it is desirable to use a white reference plate, as the reference sample, that allows the spectrum of the irradiation light to have a corrected reflectance close to 100% in the whole measurement region.

In step S5, the spectral camera 21 captures and acquires a two-dimensional spectral image of the reference sample $S_0$ at the illumination angle α1 of light emitted from the illuminator 11 under any capturing condition among (A) to (C). The illumination angle α1 at this time is the same illumination angle used when capturing the image of the sample S to be evaluated in step S2.

In step S6, the spectral camera 21 captures and acquires a two-dimensional spectral image of the reference sample $S_0$ at the illumination angle α2 of light emitted from the illuminator 12 under any capturing condition among (A) to (C). The illumination angle α2 at this time is the same illumination angle used when capturing the image of the sample S to be evaluated in step S3.

Figure 9:
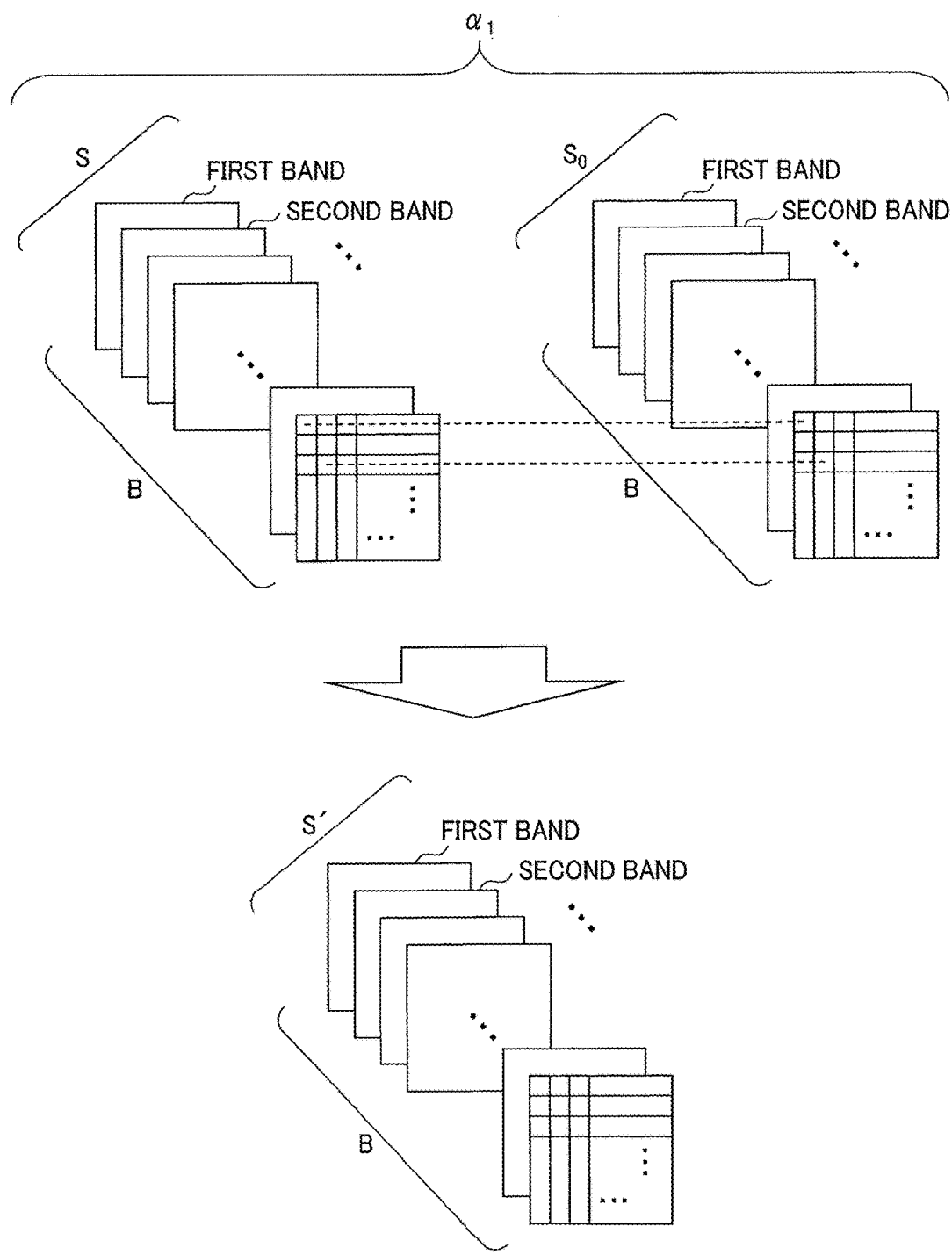
FIG. 9 is an example of a two-dimensional spectral image obtained by normalizing each pixel of each wavelength of the two-dimensional spectral image of the sample to be evaluated at each wavelength and each pixel position, and a pixel value of a sample S to be evaluated with a pixel value of a reference sample $S_0$.

Although at least the spectral reflectance images in the B types of bands are acquired in increments of wavelength x nm for the sample S to be evaluated in steps S2 and S3, spectral reflectance images are captured as for the reference sample side in steps S5 and S6 by selecting a capturing condition among the following (A) to (C) and used for calculation in the subsequent stage as illustrated in FIGS. 7 to 9. Any of (A) an average value of the entire reference sample in one band with a predetermined wavelength obtained at the illumination angle α1 and the illumination angle α2, (B) a value for each pixel of the reference sample in one band with a predetermined wavelength obtained at the illumination angle α1 and the illumination angle α2, and (C) a value for each pixel of the reference sample in a plurality of (B) bands in increments of wavelength X nm in the visible light region obtained at the illumination angle α1 and the illumination angle α2 is acquired and used for comparison.

Although (A) is greater than (B) and (B) is greater than (C) in terms that calculation is simple and can be completed in a short period of time, (C) is greater than (B) and (B) is greater than (A) in terms of higher accuracy. Thus, the condition is appropriately selected according to an application and required accuracy.

When the white reference plate is used as the reference sample $S_0$ as described above, the reflectance takes a value close to 100% for a wide wavelength band. Thus, as the reference sample is used for normalizing the spectral image of the sample to be evaluated, the spectrum of the irradiation light can be corrected, and a highly accurate spectral reflectance can be obtained for the sample to be evaluated.

In the case of performing measurement with three or more illumination angles, the acquisition of the two-dimensional spectral image by capturing the reference sample $S_0$ at the same illumination angle as the sample to be evaluated is repeated similarly while changing the illumination angles.

In step S7, a pixel value in the spectral image of the sample S to be evaluated acquired at the illumination angle $\alpha 1$ is normalized based on a pixel value in the spectral image of the reference sample $S_0$ obtained at the illumination angle $\alpha 1$.

As for the pixel value in the spectral image of the reference sample $S_0$ used in step S7, an average value of all pixels in the spectral reflectance image may be used as in (A), a value may be detected for each pixel of the spectral reflectance image as in (B), and a value may be detected for each pixel of the spectral reflectance image at each wavelength as in (C).

In step S8, normalized spectral reflectance images S' of the sample S to be evaluated with the 31 bands in increments of a wavelength of 10 nm at the illumination angle $\alpha 1$ are generated.

Here, a way of normalization and a creation example of the spectral reflectance image in steps S7 and S8 and steps S11 and S12 at each illumination angle when images are captured under the capturing conditions of (A) to (C) described above in steps S5 and S6 will be described.

<Normalization Example 1>

FIG. 7 illustrates a normalization example of a two-dimensional spectral image when the average value of the entire imaging region is used as the spectral image of the reference sample.

Specifically, examples of images of the sample S to be evaluated obtained by acquiring the spectral reflectance for each pixel with B bands in increments of the predetermined number x nm in the visible length region in step S2 are illustrated on the upper left side of FIG. 7. The upper right side illustrates an example of an image obtained by acquiring the spectral reflectance as one average value in the entire imaging region of the reference sample $S_0$ with one band at the predetermined wavelength under the condition (A) in step S5.

Then, the normalization is performed using the average value of pixel values of the entire imaging region in the spectral image of the reference sample as the reference in step S7, and the normalized spectral reflectance images S' with the B types of bands in increments of the wavelength X nm are generated as illustrated on the lower side of FIG. 7 in step S8.

FIG. 7 is a normalization example of an image with respect to one illumination angle, and the normalized spectral reflectance images S' as illustrated in FIG. 7 are generated for each of the illumination angles $\alpha 1$ and $\alpha 2$.

In this manner, the reference sample is captured at the same angle as the sample, and the sample to be evaluated is normalized using the reference sample of the same angle. Thus, it is possible to cancel the fluctuation of luminance caused by the way of applying the illumination and to acquire a proper spectral reflectance image even when the illumination angle is changed.

<Normalization Example 2>

FIG. 8 illustrates examples of two-dimensional spectral images normalized with the same pixel value for each pixel when each pixel in a captured image is used to acquire the spectral image of the reference sample.

Specifically, examples of images of the sample S to be evaluated obtained by acquiring the spectral reflectance for each pixel with B bands in increments of the predetermined number x nm in the visible length region in step S2 are illustrated on the upper left side of FIG. 8, which is similar to FIG. 7. The upper right side illustrates an example of an image of the reference sample $S_0$ obtained by acquiring the spectral reflectance for each pixel with one band at a predetermined wavelength under the condition (B) in step S5.

Then, in steps S7 and S8 of the above flow, a pixel value at each pixel position in the spectral image of the sample S to be evaluated is normalized with a value at the same pixel position of the spectral image of the reference sample $S_0$ as illustrated in the lower side of FIG. 8.

Since there is a case where luminance unevenness due to the illumination angle is distributed in the plane, the normalization with the reference sample is performed at the same position within a measurement region of the sample to be evaluated as illustrated in FIG. 8 to suppress the influence of the in-plane luminance unevenness. Accordingly, it is possible to obtain a more accurate spectral reflectance.

As a result, it is possible to further reduce the influence of a variation of the luminance unevenness caused by a variation of the illumination angle, to measure a more accurate spectral reflectance image.

<Normalization Example 3>

FIG. 9 illustrates examples of two-dimensional spectral images obtained by normalizing the pixel values of the sample S to be evaluated with the pixel values of the reference sample $S_0$ at the respective wavelengths at the respective pixel positions in the case of using the respective pixels in captured images in a plurality of wavelength bands to obtain spectral images of the reference sample.

Specifically, examples of images of the sample S to be evaluated obtained by acquiring the spectral reflectance for each pixel with B bands in increments of a predetermined number X nm in the visible length region in step S2 are illustrated on the upper left side of FIG. 9, which is similar to FIGS. 7 and 8. The upper right side illustrates examples of images of the reference sample $S_0$ obtained by acquiring the spectral reflectance for each pixel with B bands in increments of the predetermined number X nm in the visible length region under the condition (C) in step S5.

Then, as illustrated in the lower side of FIG. 9, spectral images are obtained with the plurality of bands, the same as the plurality of bands used to measure the samples to be evaluated S, even for the reference sample $S_0$ in steps S7 and S8 of the above-described flow, as illustrated in FIG. 9. Thus, it is possible to normalize the pixel values of the sample S to be evaluated with the pixel values of the reference sample $S_0$ at the respective illumination angles, at the respective pixel positions, and at the respective wavelengths.

If illumination light has the same intensity in a wavelength band B of a measurement range, the spectral reflectance of the sample S to be evaluated can be calculated using the pixel value of the spectral image of the reference sample $S_0$ in a certain band.

However, in practice, the illumination light has a spectral distribution, and the intensity of the illumination light differs for each band.

The technique illustrated in FIG. 9 in the condition (C) is used to perform normalization in each band so that the normalization is performed in consideration of the influence of the spectral distribution of the illumination light. Thus, it is possible to generate a normalized two-dimensional spectral reflectance image.

As a result, not only the influence of the in-plane luminance unevenness but also the influence of the intensity of the spectral distribution for each wavelength is suppressed. Thus, it is possible to further obtain the more accurate spectral reflectance image of the sample S to be evaluated.

After calculating the spectral reflectance image S (normalized spectral reflectance image) by any technique of FIGS. 7 to 9, tristimulus values XYZ and L*a*b* values, which are color information, are calculated for each illumination condition in order to evaluate the color of the sample to be evaluated (also referred to as the measurement target or the sample).

Referring back to FIGS. 6A and 6B, in step S9, tristimulus values (XYZ) of each pixel of the spectral reflectance image S' at the illumination angle α1 are calculated.

The tristimulus values (XYZ) can be calculated from the spectral reflectance of the measurement target, the color matching function, and the spectral distribution of the light source. Since the tristimulus values are perceptual sensitivities of L, M and S-cones of human's eyes which sense light of colors, it is possible to measure color information of the measurement target having high correlation with the look as a numerical value by obtaining the tristimulus values.

Specifically, the color matching function corresponds to a function of a sensitivity obtained when human senses a color defined by the CIE (International Commission on Illumination), more specifically, a function of perceptual sensitivities of L, M and S-cones of human's eyes which sense light of colors, and a two-degree field of view and a ten-degree field of view are defined.

Arbitrary observation condition (a color of an illumination) to be desirably evaluated, such as D50, D65, and a standard light source A, and the color matching function corresponding to a spectral distribution according to the illumination are stored in advance in, for example, the calculation data storage 84.

Then, as the color calculator 85 reads such information, it is possible to calculate the tristimulus values XYZ and L*a*b* values, which are numerical color information, according to various observation conditions.

Hereinafter, for example, a calculation example when using the ten-degree field of view and a spectral distribution under a D50 condition will be described.

Conversion formulas are expressed as follows.

$$X=k\int S(\lambda)x(\lambda)R(\lambda)d\lambda$$

$$Y=k\int S(\lambda)y(\lambda)R(\lambda)d\lambda$$

$$Z=k\int S(\lambda)z(\lambda)R(\lambda)d\lambda$$

$S(\lambda)$: Spectral Distribution of Light Source
$x(\lambda)$, $y(\lambda)$, and $z(\lambda)$: Color Matching Functions
$R(\lambda)$: Spectral Reflectance
k: Coefficient
Here, k is obtained by the following formula.

$$k=100/\int S(\lambda)y(\lambda)d\lambda$$

Step S10: The tristimulus values (XYZ) calculated in step S9 are used to calculate L*a*b* color values (chromaticity values) of each pixel of the spectral reflectance image S' at the illumination angle α1. Specifically, the tristimulus values XYZ are converted to L*a*b* in order for conversion to the chromaticity values. A method defined by the CIE is used as a conversion formula.

$$L^*=116(Y/Yn)^{1/3}-16$$

$$a^*=500[(X/Xn)^{1/3}-(Y/Yn)^{1/3}]$$

$$b^*=500[(Y/Yn)^{1/3}-(Z/Zn)^{1/3}]$$

Here, Xn, Yn, and Zn are tristimulus values at a perfect reflecting diffuser. In the case of the spectral distribution of D50, Xn: 96.42, Yn: 100, and Zn: 82.49. This operation is applied to all the pixels of the spectral reflectance image.

Since the L*a*b* space arranges all the colors in a space having a scale approximately equal to a scale of human perception, it is possible to express a color as a numerical value as an expression method that is even closer to the way of feeling of human by calculating the L*a*b* values.

Although the calculation operation at the illumination angle α1 has been described in steps S7 to S11, the following steps S11 to S14 are similarly executed for the illumination angle α2. Although FIGS. 6A and 6B illustrate an example in which the calculation processes at the illumination angle α1 and the illumination angle α2 are performed concurrently, steps S11 to S14 may be executed after steps S7 to S10, or steps S7 to S10 may be executed after steps S11 to S14. Alternatively, the calculation processes at the illumination angle α1 and the illumination angle α2 may be executed, for example, in the order of steps S7, S11, S8, S12, S9, and S13.

In step S11, the pixel value in the spectral image of the sample S to be evaluated acquired at the illumination angle α2 is normalized by the pixel value in the spectral image of the reference sample $S_0$ obtained at the illumination angle α2.

Similarly to step S7, the average value of pixel values in the spectral image, which is the imaging region, under the condition (A) as illustrated in FIG. 7 may be used as the image of the reference sample $S_0$ acquired in step S7 used for the normalization in step S11. Alternatively, a value may be detected for each pixel in the imaging region under the condition (B) as illustrated in FIG. 8, or any value obtained for each pixel in the imaging region for each wavelength band under the condition (C) as illustrated in FIG. 9 may be used.

In step S12, normalized spectral reflectance images S' with the 31 bands in increments of a wavelength of 10 nm at the illumination angle α2 are generated.

Step S12: Tristimulus values (XYZ) of the normalized spectral reflectance image S' at the illumination angle α2 are calculated.

Step S13: The tristimulus values (XYZ) calculated in step S12 are used to calculate L*a*b* color values of each pixel of the normalized spectral reflectance image S' at the illumination angle α2.

From the above operation, it is possible to acquire the spectral reflectance images, XYZ images, and L*a*b* images of the sample to be evaluated at the plurality of illumination angles.

When the sample to be evaluated and the reference sample are measured at three or more illumination angles, the normalization processing, the creation of normalized spectral images, the calculation of tristimulus values XYZ, and the processing of L*a*b* values are executed for all the illumination angles.

As in the above flow, images are captured at different illumination angles such that the reference sample is captured at the same angle as the sample for each of the plurality of illumination angles. As the sample to be evaluated is normalized using the reference sample at the same angle, it is possible to cancel the fluctuation in luminance caused by the way of applying the illumination.

In addition, as the images are captured at the plurality of illumination angles, it is possible to quantitatively evaluate a paint containing glittering materials that looks different depending on viewing angles.

<Measurement Image>

Figure 10A:
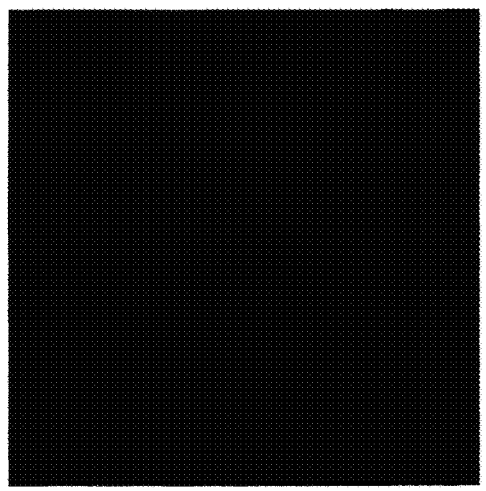
Figure 10B:
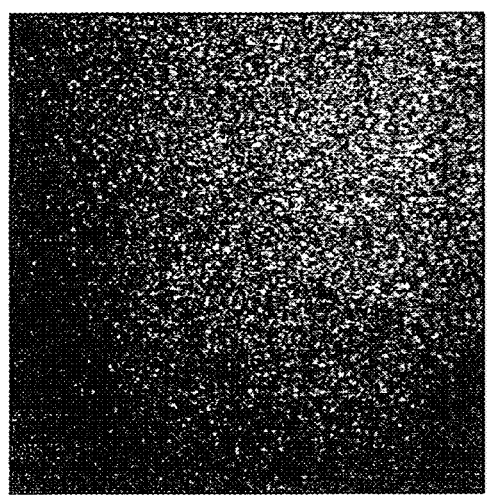
Figure 10C:
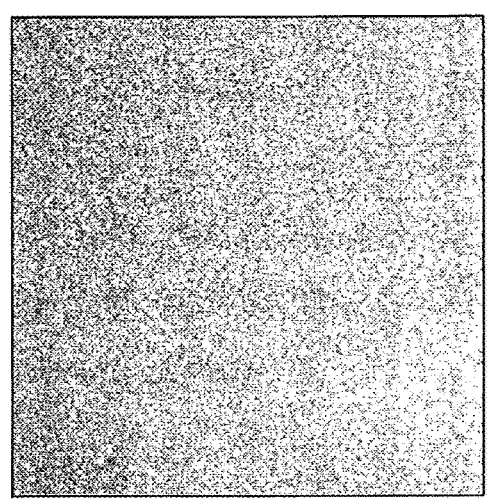

FIGS. 10A to 10C illustrate an example of an L* image (luminance image) obtained by capturing a painted surface containing aluminum flakes as a sample to be evaluated which is measured under a plurality of conditions.

FIG. 10A illustrates an L* image obtained by normalizing a spectral image of the sample to be evaluated measured at a certain illumination angle based on a pixel value of the reference sample measured at another illumination angle, FIG. 10B illustrates an L* image normalized by the technique described in FIG. 7, and FIG. 10C illustrates an L* image normalized by the technique described in FIG. 9.

Comparing FIG. 10A with FIG. 10B, the normalization is performed based on the pixel value at the different illumination angle in FIG. 10A. Thus, an image that is dark overall is obtained, and the aluminum flakes are not captured.

On the other hand, the influence of the fluctuation in luminance due to the variation of the illumination angle is suppressed in FIG. 10B to which the present disclosure is applied, so that an image in which the aluminum flakes are captured is obtained.

In addition, FIG. 10C is obtained by normalizing the spectral images of the sample to be evaluated measured at the same illumination angle $\alpha1$ using the respective pixel values of the spectral images of the reference sample, similarly measured at the illumination angle $\alpha1$, at all the pixel positions and in all the wavelength bands through the processing described referring to FIG. 9.

Comparing FIG. 10B with FIG. 10C, the influence of the in-plane luminance unevenness is reduced in FIG. 10C more than in FIG. 10B, and light emission by the aluminum flake is captured in the whole image.

Therefore, the measurement through the processing described referring to FIG. 9 is preferable since the accuracy is higher except for a case where it is desired to perform evaluation particularly in a short time.

[Second Embodiment]

Figure 11:
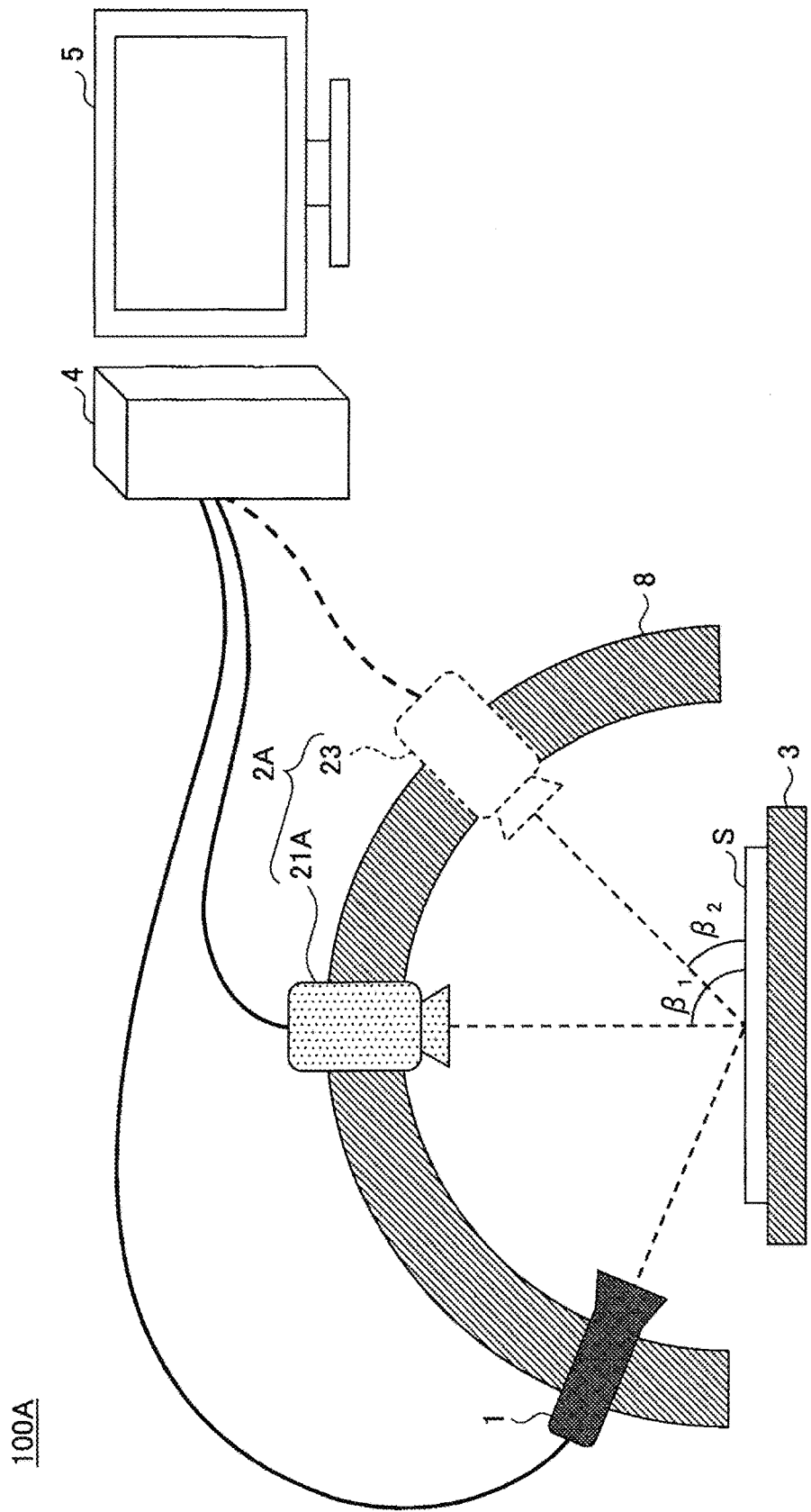
FIG. 11 is an overall schematic view of a color measurement apparatus according to a second embodiment of the present disclosure.

FIG. 11 illustrates an overall schematic view of a color measurement apparatus 100A according to a second embodiment of the present disclosure.

Although the plurality of illuminators is provided for measurement at the plurality of illumination angles in the above-described first embodiment, a plurality of imagers (cameras 21A and 23) may be provided to perform measurement at a plurality of capturing angles as illustrated in FIG. 11.

In the configuration illustrated in FIG. 11, the first camera (imager) 21A and the second camera (imager) 23 are arranged so as to have different capturing angles with respect to the inspection table 3 on which a sample to be evaluated is placed. Thus, an imaging device 2A can image the sample on the inspection table 3 at two capturing angles. The number of cameras to be installed may be increased to increase the number of set capturing angles.

In the present embodiment, selection of the imager (the camera 21A or the camera 23) to be used for capturing is instructed instead of instructing selection of an illumination to be used at the time of capturing.

Thus, the imaging controller 82 includes an imager selection instruction unit 822 to be executable in an information processing apparatus of the second embodiment instead of providing the illuminator selection instruction unit 811 in the illumination controller 81 as in the first embodiment as described referring to the above FIG. 5.

Since the measurement is performed at the plurality of capturing angles in the present embodiment, it is possible to obtain a measurement value in conformity with visual impression when observing the sample.

Although images of the plurality of capturing angles are acquired by using the plurality of imagers in FIG. 11, an imaging device 2B that includes one imager including a line sensor 20 may be used so as to acquire the plurality of capturing angles as illustrated in FIG. 12.

When the line sensor 20 which is a line scanning-type imaging device is used as the imaging device 2B as illustrated in FIG. 12, spectral images are acquired while successively changing the illumination angle or the capturing angle. Thus, it is possible to collect the spectral images measured at the plurality of capturing angles in one measurement image.

As the sample S to be evaluated and the reference sample $S_0$ are captured to perform normalization by the above-described method, it is also possible to acquire spectral reflectance images at the plurality of at least one of illumination angles and capturing angles at one time.

<Color Measurement Flow>

FIGS. 13A and 13B are illustrations of a flowchart of color measurement in the color measurement apparatus of the second embodiment having the configuration illustrated in FIG. 11.

Step S101: The first camera 21A confirms whether the sample S to be evaluated has been placed on the inspection table 3.

Step S102: The first camera 21A acquires a two-dimensional spectral image of the sample S to be evaluated at a capturing angle $\beta1$.

Step S103: The second camera 23 acquires a two-dimensional spectral image of the sample S to be evaluated at a capturing angle $\beta2$.

In steps S102 and S103, each of the spectral camera 21A and 23 captures and acquires two-dimensional spectral images in B bands (31 bands (wavelength bands) in the above-described case) in increments of a predetermined number x nm (for example, 10 nm) in the visible light region (for example, 400 nm to 700 nm).

In the case of performing measurement with three or more capturing angles, the different imagers capture images for the sample S to be evaluated by changing the capturing angle in the same manner, thereby repeating the acquisition of the two-dimensional spectral image.

When the acquisition of the two-dimensional spectral image of the sample S to be evaluated is completed, a type of the sample on the inspection table is replaced.

Step S104: The first spectral camera 21A confirms whether the reference sample $S_0$ has been placed on the inspection table 3.

Step S105: The first spectral camera 21A acquires a two-dimensional spectral image of the reference sample $S_0$ at the capturing angle $\beta1$.

Step S106: The second spectral camera 23 acquires a two-dimensional spectral image of the reference sample $S_0$ at the capturing angle $\beta2$.

In steps S105 and S106, any capturing condition of the following (A) to (C) is selected to capture images to be used for calculation in the subsequent stage as illustrated in FIGS.

7 to 9. (A) An average value of the entire reference sample in one band with a predetermined wavelength obtained at the capturing angle β1 and the capturing angle β2, (B) a value for each pixel of the reference sample in one band with a predetermined wavelength obtained at the capturing angle β1 and the capturing angle β2, and (C) a value for each pixel of the reference sample in a plurality of (B) bands in increments of wavelength X nm in a visible light region obtained at the capturing angle β1 and the capturing angle β2.

Step S107: The normalization calculator 851 of the color information processing apparatus 800 normalizes pixel values in the spectral images of the sample S to be evaluated acquired at the capturing angle β1 with pixel values in the spectral images of the reference sample $S_0$ acquired at the capturing angle β1.

Step S108: Spectral reflectance images S' in 31 bands in increments of a wavelength of 10 nm at the first capturing angle β1 are generated.

Step S109: Tristimulus values (XYZ) at the capturing angle β1 are calculated based on the spectral reflectance images S' for each pixel.

In step S110, L*a*b* color values at the capturing angle β1 are calculated based on the spectral reflectance images S' for each pixel.

Although the calculation operation at the capturing angle β1 has been described in steps S107 to S110, the following steps S111 to S114 are similarly executed for images acquired at the capturing angle β2. Although FIGS. 13A and 13B illustrate an example in which the calculation processes at the capturing angle β1 and the capturing angle β2 are performed in parallel, steps S111 to S114 may be executed after steps S107 to S110, or steps S107 to S110 may be executed after steps S111 to S114. Alternatively, the calculation processes at the capturing angle β1 and the capturing angle β2 may be executed, for example, in the order of steps S107, S111, S108, S112, S109, and S113.

Step S111: The pixel value in the spectral image of the sample S to be evaluated acquired at the capturing angle β2 is normalized by the pixel value in the spectral image of the reference sample $S_0$ obtained at the capturing angle β2.

The average value of pixel values in the spectral image, which is the imaging region, under the condition (A) as illustrated in FIG. 7 may be used as the image of the reference sample $S_0$ acquired in steps S105 and S106 used for the normalization in steps S107 and S111. Alternatively, a value may be detected for each pixel in the imaging region under the condition (B) as illustrated in FIG. 8, or any value detected for each pixel in the imaging region for each wavelength band under the condition (C) as illustrated in FIG. 9 may be used.

Step S112: Normalized spectral reflectance images S' in 31 bands in increments of a wavelength of 10 nm at the capturing angle β2 are generated.

As a result, it is possible to acquire the spectral reflectance images S' of the sample to be evaluated in the wavelength band B at the respective capturing angles.

Step S113: Tristimulus values (XYZ) of each pixel of the spectral reflectance image S' at the capturing angle β2 are calculated.

Step S114: The tristimulus values (XYZ) calculated in step S113 are used to calculate L*a*b* color values of each pixel of the spectral reflectance image S' at the capturing angle β2.

From the above operation, it is possible to acquire the spectral reflectance images, XYZ images, and L*a*b* images of the sample to be evaluated at the plurality of capturing angles.

When the sample to be evaluated and the reference sample are measured at three or more capturing angles, each of the normalization, the creation of normalized spectral images, the calculation of tristimulus values XYZ, and the processing of L*a*b* values is executed for data of all the capturing angles.

As in the above flow, images are captured at different capturing angles such that the reference sample is captured at the same angle as the sample for each of the plurality of illumination angles. As the sample to be evaluated is normalized using the reference sample at the same angle, it is possible to cancel the fluctuation in luminance caused by the way of applying the illumination.

In addition, as the images are captured at the plurality of capturing angles, it is possible to quantitatively evaluate a paint containing glittering materials that looks different depending on viewing angles.

[Third Embodiment]

Figure 14:
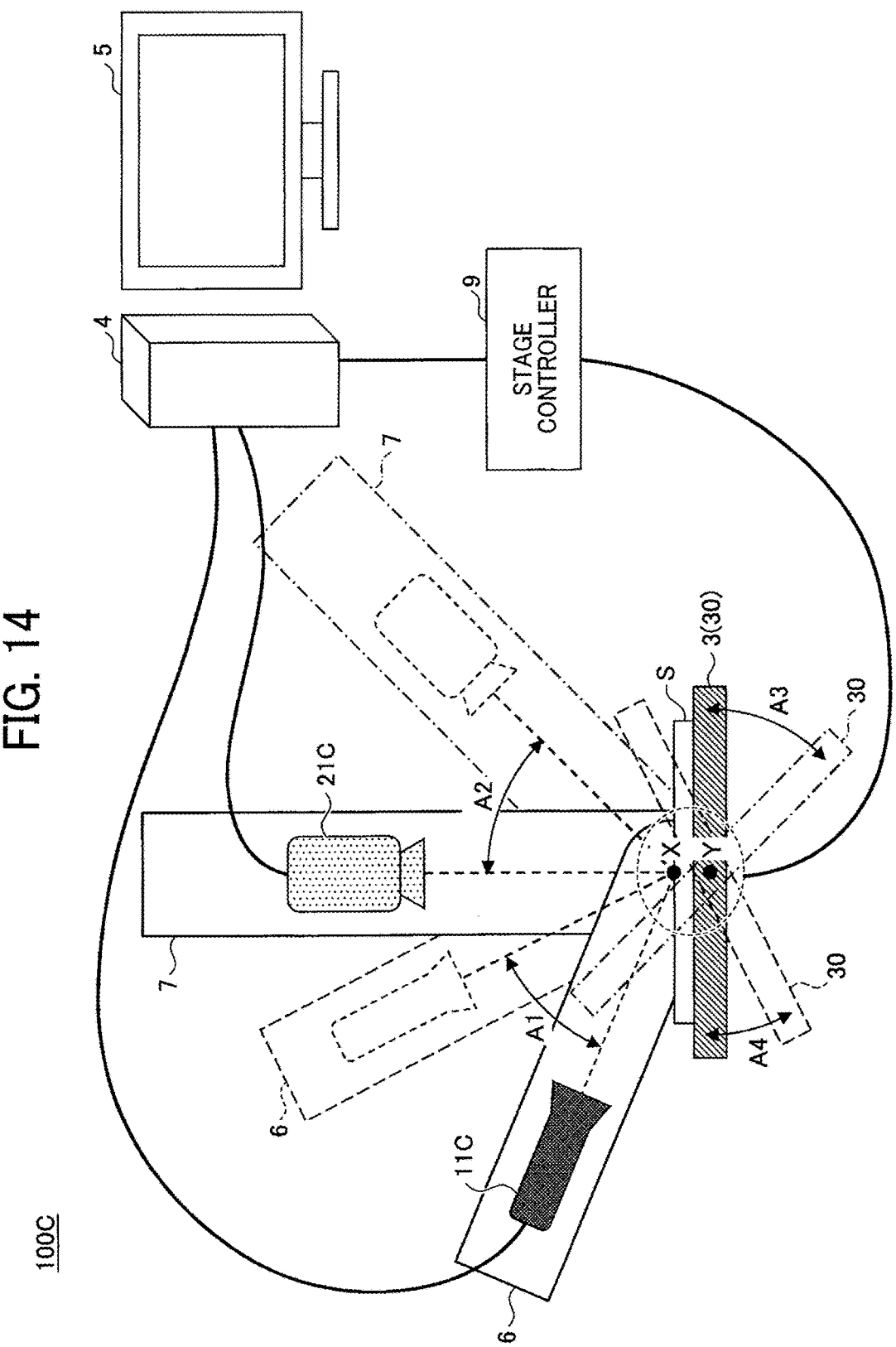
FIG. 14 is an overall schematic view of a color measurement apparatus according to a third embodiment of the present disclosure.

FIG. 14 is an overall schematic view of a color measurement apparatus 100C according to a third embodiment of the present disclosure.

Although the plurality of illuminators 1 is provided to perform capturing at the plurality of illumination angles in the above-described first embodiment, it is also possible to move an illuminator to be capable of changing an illumination angle to an arbitrary value.

Specifically, it is conceivable to change the illumination angle by holding the illuminator using a driving device (light source holding stage), such as a rotary stage, as illustrated by a solid line and a dotted line in FIG. 14. Specifically, a light source holding stage 6 has, for example, plate-shaped side surfaces (a front surface and a back surface on the paper surface of FIG. 14), an upper surface supporting the illuminator 1, and a lower surface integrated with a driving mechanism, and is separated from a sample holding plate 30 of the inspection table 3. As a result, the light source holding stage 6 is pivotally rotated about a central portion X of the inspection table 3 to cause the illuminator to move together with the light source holding stage 6 as indicated by an arrow A1 with respect to the immovable inspection table 3, thereby changing the illumination angle with respect to the sample.

Alternatively, it is also conceivable to change the illumination angle by a camera holding stage 7 holding the camera as in another example illustrated by a solid line and a one-dot chain line in FIG. 14. The camera holding stage 7 has, for example, plate-shaped side surfaces (a front surface and a back surface on the paper surface of FIG. 14), an upper surface supporting the camera 21C, and a lower surface integrated with the sample holding plate 30 of the inspection table 3 as illustrated by a dotted line X in FIG. 14. As a result, the camera holding stage 7 is pivotally rotated to change an angles of the camera 21C and the sample holding plate 30 together with the camera holding stage 7 as indicated by arrows A2 and A3 while an illuminator 11C is immovable, thereby relatively changing the illumination angle with respect to the sample.

The plurality of imagers (cameras) is provided to perform capturing at the plurality of capturing angles in the above second embodiment. In the present embodiment, however, it is also possible to perform measurement from the plurality of capturing angles or enable the change of the capturing angle to the arbitrary value by moving an imaging device.

It is conceivable to hold the camera by a driving device (camera holding stage), such as a rotary stage, to change the capturing angle as illustrated by a solid line and a one-dot chain line in FIG. 14. Specifically, the camera holding stage 7 has, for example, plate-shaped side surfaces (a front surface and a back surface on the paper surface of FIG. 14), an upper surface supporting the camera 21C, and a lower surface integrated with the driving mechanism, and is separated from the sample holding plate 30 of the inspection table 3. As a result, the camera holding stage 7 is pivotally rotated about the central portion X of the inspection table 3 to cause the camera 21C to move together with the camera holding stage 7 as indicated by the arrow A2 with respect to the immovable inspection table 3, thereby changing the capturing angle with respect to the sample.

Alternatively, as another example, it is conceivable to change the capturing angle by the light source holding stage 6 holding the illuminator 11C as illustrated by a dotted line in FIG. 14. The light source holding stage 6 has, for example, plate-shaped side surfaces (a front surface and a back surface on the paper surface of FIG. 14), an upper surface supporting the illuminator 11C, and a lower surface integrated with the sample holding plate 30 of the inspection table 3. As a result, the light source holding stage 6 is pivotally rotated to change an angles of the illuminator 11C and the sample holding plate 30 together with the light source holding stage 6 as indicated by the arrows A1 and A4 while the camera 21C is immovable, thereby changing the capturing angle with respect to the sample.

With such a configuration, it is possible to perform measurement not only at a prescribed capturing angle but also at a plurality of arbitrary capturing angles suitable for the evaluated sample to be measured.

Figure 15:
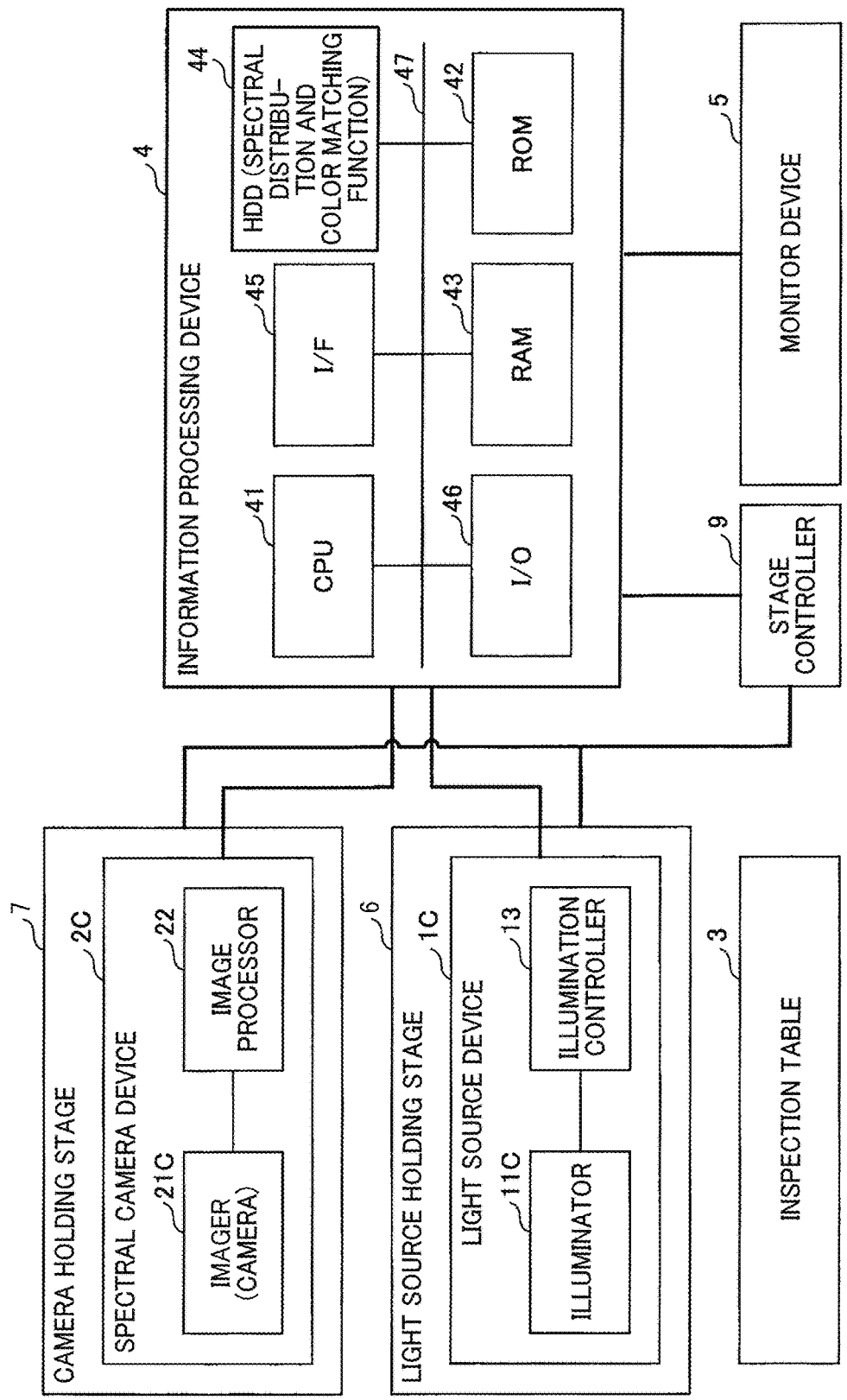
FIG. 15 is a hardware block diagram of the color measurement apparatus of the third embodiment.

FIG. 15 illustrates a hardware block diagram of the color measurement apparatus of the third embodiment.

Although it is almost the same as the configuration of FIG. 5, the light source holding stage 6 that holds the illuminator 11C, the camera holding stage 7 that holds the spectral camera 21C, and a stage controller 9 are provided in the present embodiment. As the stage controller 9 is controlled to be driven, it is possible to rotationally drive the light source holding stage 6 holding the illuminator 11C and the camera holding stage 7 holding the camera 21C. The sample holding plate 30 of the inspection table 3 may be pivotally rotatable in conjunction with the stage as illustrated as another example described above.

In the third embodiment, the illumination controller 81 in the color information processing apparatus 800 includes the stage position instruction unit 812 to be executable instead of the illuminator selection instruction unit 811 used in the first embodiment referring to the above functional block diagram of FIG. 5

In the present embodiment, the selection of an illumination to be used at the time of capturing is not instructed to perform selection from among the plurality of illuminators, but is instructed to the stage controller 9 from the information processing device 4. Thus, the stage controller 9 causes the light source holding stage 6 to pivot about the central portion X of the inspection table 3, thereby changing a position of a light source device 1C to change the illumination angle.

Similarly, the imaging controller 82 in the color information processing apparatus 800 includes a stage position instruction unit 823 to be executable instead of the imager selection instruction unit 822 used in the second embodiment, in the third embodiment as described in the above FIG. 5.

In the present embodiment, the information processing device 4 instructs the stage controller 9 instead of instructing the selection of the imager to be used for capturing. Thus, the stage controller 9 causes the camera holding stage 7 to pivot about the central portion X of the inspection table 3, thereby changing a position of an imaging device 2C and changing the capturing angle.

Although FIGS. 14 and 15 illustrate configurations corresponding to an example in which both of the light source device 1C and the imaging device 2C are movable, either the light source device 1C or the imaging device 2C may be movable.

As described above, the illuminator 11A is attached to the movable light source holding stage 6, so that the illumination angle of light emitted from the illuminator can be successively changed. Thus, the illumination angle can be changed to arbitrary angles other than a specific angle, and thus, can deal with measurement of various kinds of samples.

In addition, the imaging device can successively change the capturing angle as the movable camera holding stage 7 is attached to the camera 21A as described above. Thus, the capturing angle can be changed to arbitrary angles other than a specific angle, and thus, can deal with measurement of various kinds of samples.

In addition to the exemplary embodiments of the above configurations, the additional adjustment example for measurement of color information on a measurement target having a high correlation with the human eyes using control and adjustment in an information processing device and an imaging device will be described below.

<Adjustment Example 1>

Adjustment Example 1 is an example of adjusting a black color based on noise at dark current.

Figure 16A:
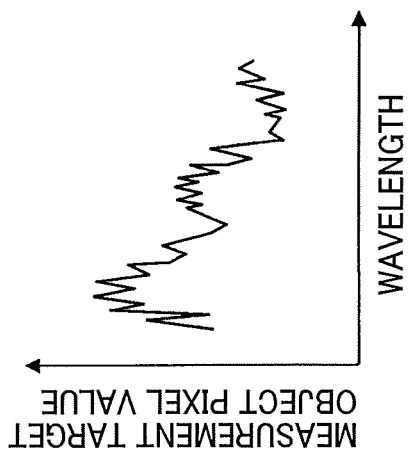
FIGS. 16A to 16C are explanatory graphs of a wavelength distribution of image correction using a dark current pixel value.
Figure 16B:
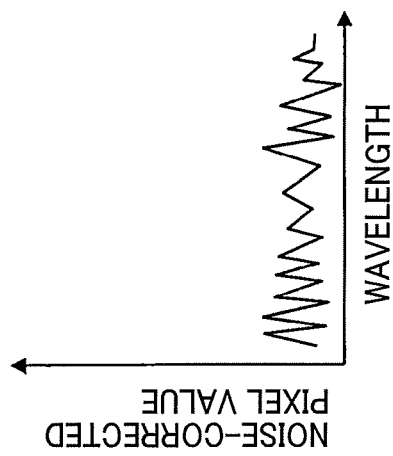
Figure 16C:
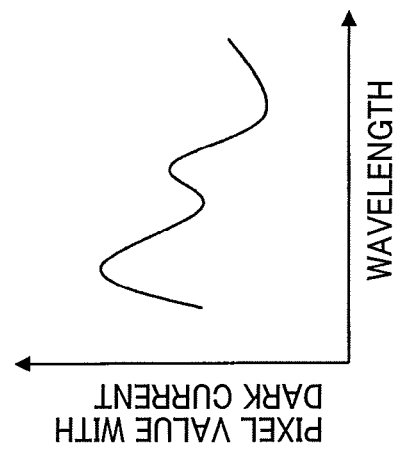

FIGS. 16A to 16C are explanatory graphs of a wavelength distribution of image correction using a dark current pixel value; FIG. 16A is a graph of a reflectance of a sample to be evaluated at a certain wavelength, FIG. 16B is a graph of a reflectance of a dark current value, and FIG. 16C is a graph of a reflectance after noise elimination.

In the color measurement apparatus of the present disclosure configured according to any one of the above-described first to third embodiments, images are captured in a state where incident light to the imaging device 2 is entirely blocked before entering the calculation step. With such capturing, it is possible to acquire spectral pixel information (noise) at the time of dark current where there is no spectral information on an object to be measured as noise data as illustrated in FIG. 16B.

At the time of such dark current measurement, for example, a lid of the lens (not illustrated) of the spectral camera 21 is covered by a lens lid open/close instruction unit 824 to create the blocked state in the functional block illustrated in FIG. 15, thereby setting a state where there is no spectral information on the object to be measured. As the measurement is performed in such a state, it is possible to acquire the spectral pixel information (noise) at dark current.

As illustrated in FIGS. 16A to 16C, a value of data of a dark current value illustrated in FIG. 16B is subtracted from measurement data illustrated in FIG. 16A to acquire measurement data from which the noise has been removed as illustrated in FIG. 16C.

Therefore, as the spectral pixel information at the dark current is subtracted from the data at the time of measuring the measurement target, it is possible to perform the measurement with reduced noise. It is possible to further reduce the noise and enhance the measurement accuracy.

As the measurement result obtained by blocking the incident light to the imaging device (at the dark current) is used in this manner, it is possible to perform calibration of the black color in the sample. With such adjustment, dark current correction is performed, so that it is possible to reduce the influence of noise at the time of measurement and to improve an S/N ratio.

<Adjustment Example 2>

Figure 17:
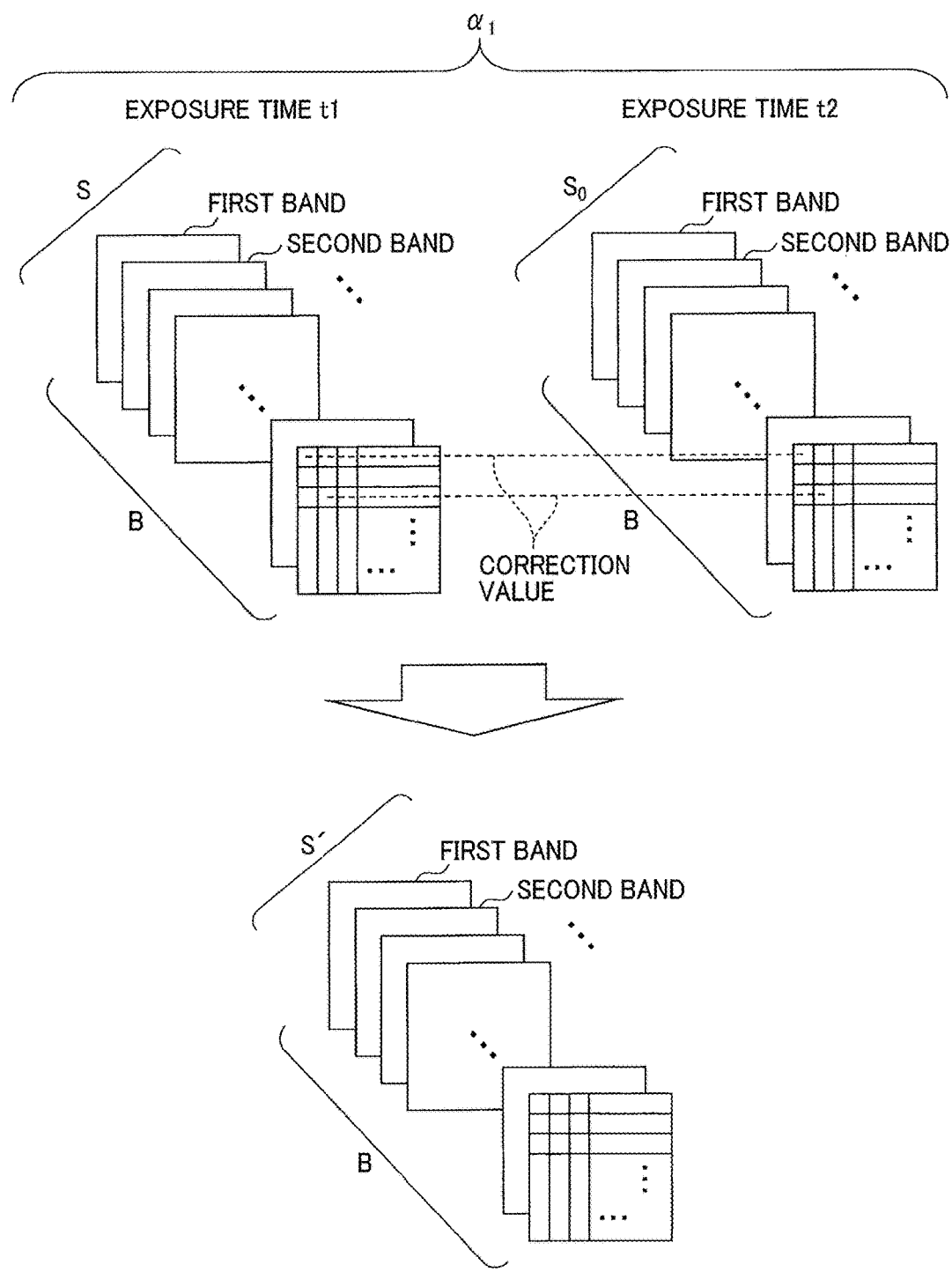
FIG. 17 illustrates an example of an image when an exposure time is changed between a sample to be evaluated and a reference sample in accordance with luminance.

FIG. 17 illustrates an example of an image when an exposure time is changed between a sample to be evaluated and a reference sample according to a luminance.

When a luminance value of the sample to be evaluated is small, it is preferable to increase the exposure time in order to obtain a spectral image of the sample S to be evaluated with little noise. However, when the reference sample $S_0$ is captured with such a long exposure time, a pixel value of the reference sample $S_0$ is saturated so that there is a possibility that it is difficult to acquire a proper spectral image.

FIG. 17 illustrates a procedure at the time of measuring the sample S to be evaluated. FIG. 17 illustrates an example in which measurement is performed using the technique of FIG. 9 and further adjustment is performed according to the additional adjustment example.

It is assumed that the exposure time when measuring the spectral image of the sample S to be evaluated is t1 and the exposure when measuring the spectral image of the reference sample $S_0$ is t2. In the above-described normalization, the exposure time t1 when imaging the sample to be evaluated and the exposure time t2 when imaging the reference sample are made different such that the exposure time t1>the exposure time t2.

At this time, a large value is used as t1 such that the spectral image of the sample S to be evaluated is a sufficiently dominant data, and a small value is selected as t2 such that the pixel value of the spectral image of the reference sample $S_0$ is not saturated. In this manner, it is possible to reduce the noise of the spectral image of the sample S to be evaluated and to prevent saturation of the spectral image of the reference sample $S_0$.

When measuring a dark sample having a low spectral reflectance, it is preferable to increase the exposure time in order to measure dominant reflected light from the sample. When the white reference plate is measured with such an exposure time, measurement data is saturated. Therefore, the exposure time is changed between the sample (measurement target) and the white plate (reference object) to prevent the saturation.

As illustrated in FIG. 17, as a case of changing the exposure times t1 and t2, the flow as illustrated in FIGS. 6 and 13 may be performed, then the exposure time may be changed to redo the flow when a difference in luminance is too large at the time of normalization to execute the flow again from the capturing step.

Alternatively, when a difference in color between the sample S to be evaluated and the reference sample $S_0$ is apparent based on visual observation, the user may select an exposure time from a plurality of options or variably adjust the exposure time such that the exposure time becomes longer as the sample to be evaluated becomes darker so that the exposure time is arbitrarily adjusted before capturing and then, the capturing is performed.

As described above, when the exposure times t1 and t2 are made different, the amount of incident light when measuring each of the sample S to be evaluated and the reference sample $S_0$ is different.

When acquiring a spectral reflectance, it is preferable to perform normalization with pixel values of the sample to be evaluated and the reference sample when measured with the same amount of incident light. Thus, a value obtained by correcting the pixel value of the reference sample $S_0$ is used at the time of performing normalization from the two spectral images in order to obtain an accurate spectral reflectance image.

Specifically, a value obtained by multiplying the pixel value of the measured reference sample $S_0$ by t1/t2 is used in the present embodiment. As a result, it is possible to acquire a highly accurate spectral reflectance image even for a sample to be evaluated having a low luminance.

When the exposure time is made different in this manner, it is possible to accurately measure a state (texture) of the surface of a dark sample. Since the amount of incident light from the illuminator is different between the case of measuring the sample to be evaluated and the case of measuring the reference sample when the exposure time is made different, correction is performed by multiplying the pixel value of the reference sample by a time ratio between the exposure times. With such correction, it is possible to further enhance the accuracy of the measurement value of the spectral reflectance.

<Adjustment Example 3>

Figure 18:
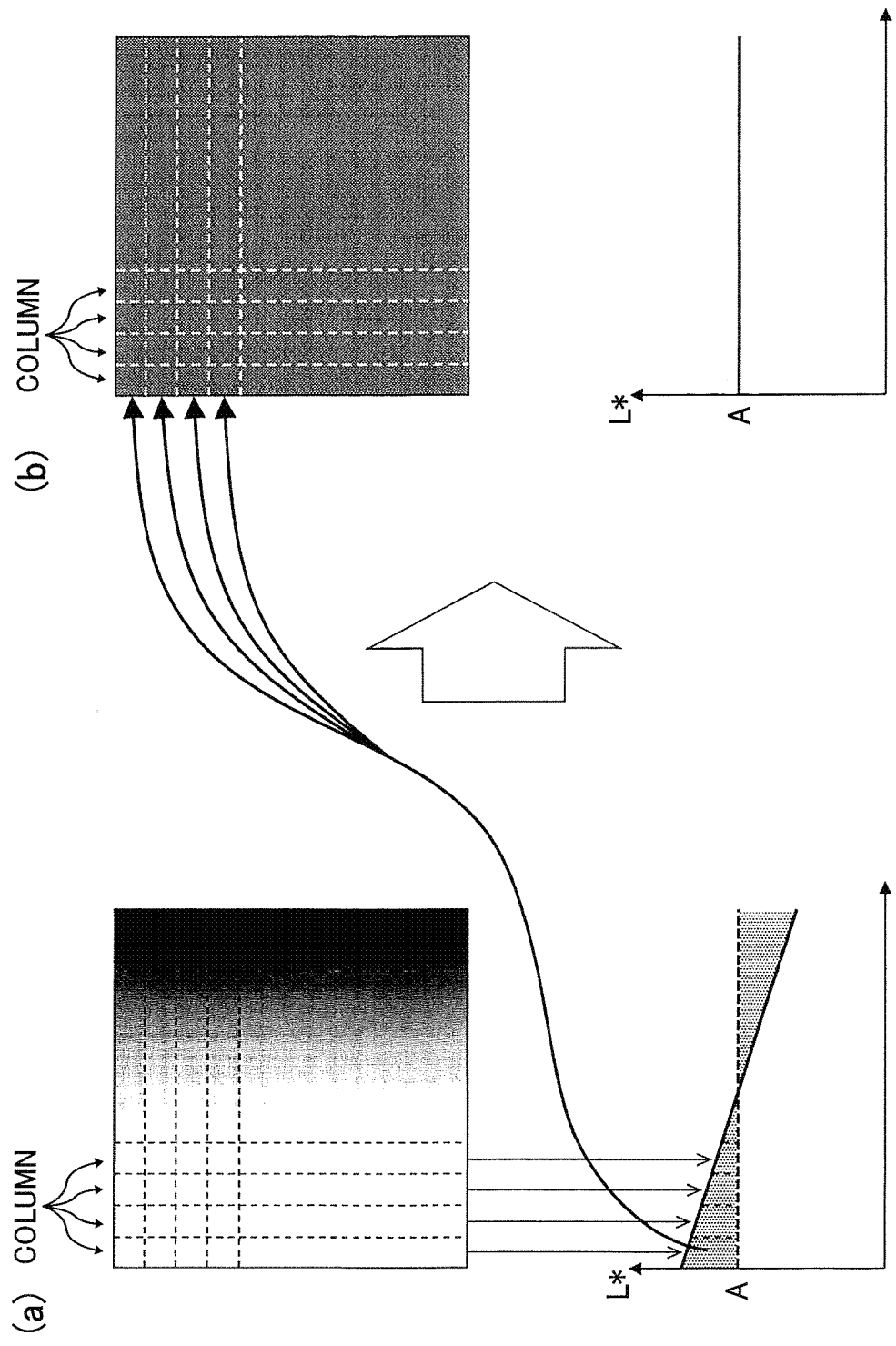
FIG. 18 is an example of luminance adjustment for each column in a normalized spectral image.
Figure 19:
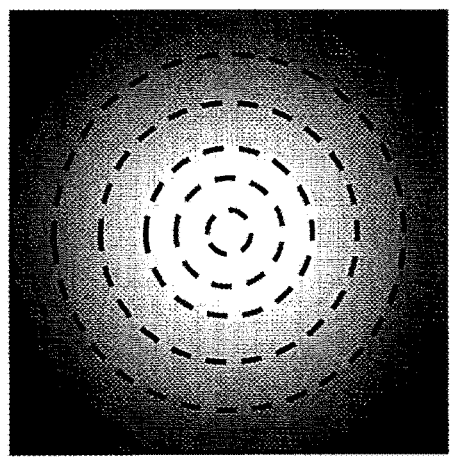
FIG. 19 is an example of luminance adjustment in a circumferential direction in the normalized spectral image.

FIGS. 18 and 19 illustrate examples of adjusting luminance unevenness for each part.

Although the influence of luminance unevenness of the illumination can be reduced by the technique described in the above embodiment, there is a case where surfaces of a reference sample and a sample to be evaluated may be inclined at different angles due to presence of a foreign matter such as dust on the inspection table or distortion of any one of the samples. When the states of the surfaces are different from each other due to an installation state in this manner, there is a case where influence of an installation angle of the surface remains even after normalization is performed for each pixel at the same illumination angle, and luminance unevenness may occur as illustrated in FIG. 18(a).

Thus, an adjustment process that can resolve the above-described influence and be implemented after imaging will be described. FIG. 18 illustrates an example of adjusting a luminance for each column, and FIG. 19 illustrates an example of adjusting a luminance concentrically in a circumferential direction.

For example, it is possible to consider a case where luminance unevenness remains in a processed L* image as in the upper image in FIG. 18(a).

Here, when an L* average value in each column of the L* image is plotted, the L* image of FIG. 18(a) has a gradient as illustrated in the lower graph of FIG. 18(a). It is assumed that an L* average value in the entire image is A. In this example, A which is the L* average value in the entire image is set as a reference value.

In the example where luminance unevenness is present in the lateral direction as illustrated in FIG. 18(a), a process of calculating a ratio between the L* average value at each column and A, and multiplying a value of L* (lightness) of at each column by the ratio is performed as illustrated in the lower side of FIG. 18(b). As a result, it is possible to reduce the influence of the luminance gradient and obtain an image of the sample to be evaluated with high accuracy as illustrated in the upper view of FIG. 18(b).

In order to reduce the influence of luminance unevenness as described above, it is also possible to take not only the ratio but also a difference between the L* average value and A.

In the present adjustment example, the L* average value at each column is calculated, and a correction value is calculated with each column as a unit of a correction part as illustrated in the lower side of FIG. 18(b). However, the division of a part is not limited to the column or a row.

FIG. 19 illustrates an example in which luminance unevenness is generated in the circumferential direction. For example, if the center of the surface of either the sample to be evaluated or the reference sample is recessed or protrudes, luminance unevenness may occur even in a normalized image as illustrated in FIG. 19 due to a difference in height of unevenness of the surfaces.

In such a case, it is also possible to calculate an average value in the circumferential direction from the image center or to use an arbitrary value as indicated by a dotted line in FIG. 19.

The division of the part is not limited to the row or the circumferential direction, but may be set to any shape. The value used as a reference is not limited to the average value of the entire screen, but may be set to an arbitrary value.

The example of the L* image is illustrated in the above-described example. However, it is possible to calculate a correction value representing a variation from a certain reference value with respect to a two-dimensional image (chromaticity or the like) of the sample to be evaluated based on tristimulus values XYZ or L*a*b* values and to perform chromaticity correction using the correction value in the same method as in FIG. 18.

According to such an additional adjustment example, even when luminance unevenness corresponding to the amount that is not corrected by normalization of the white plate is generated, a gradient of chromaticity of each row or the entire image is calculated and corrected to make the gradient zero, and such correction is applied to the XYZ values or L*a*b* values of each pixel, so that it is possible to correct the luminance unevenness.

<Additional Adjustment Example 4>

Figure 20A:
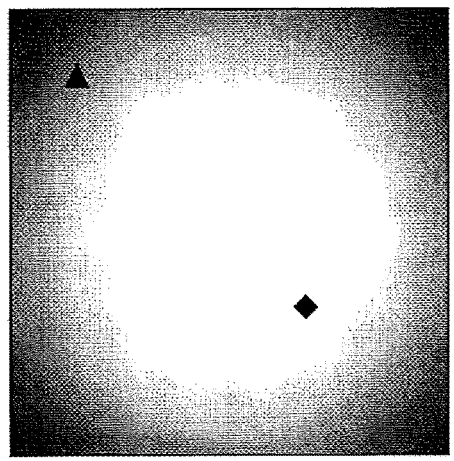
FIGS. 20A and 20B are examples of noise reduction correction of a white plate.
Figure 20B:
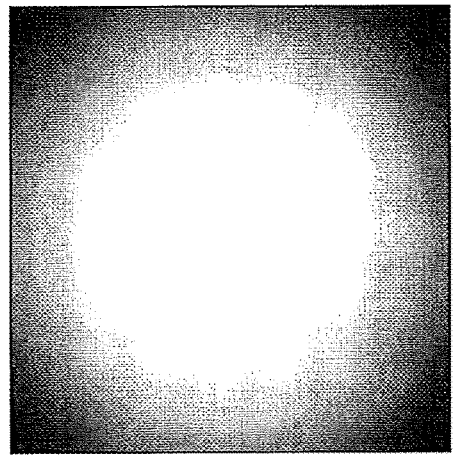

FIGS. 20A and 20B illustrate an example of white plate noise reduction correction.

The spectral reflectance is normalized from a captured result by using the white reference plate as the reference sample in all the above-described embodiments. However, when a spectral image of the white reference plate contains noise, the spectral reflectance indicates an abnormal value if the normalization is performed using the spectral image.

In order to avoid such a problem, it is conceivable to perform white plate noise reduction correction by image processing such that noise is reduced in the spectral image of the white reference plate before performing the normalization in step S7 in FIGS. 6A and 6B.

For example, a case where white does not locally appear due to presence of deposits such as trash and dust in a part of a captured image of the white reference plate will be described in FIG. 20A.

For the foreign matter locally present as illustrated in FIG. 20A, a median filter is applied to the spectral image of the white reference plate as the white plate noise reduction correction so that noise can be reduced. The median filter removes noise by processing of converting a certain pixel (noise) to a median value of density of surrounding pixels. Here, an example in which a kernel size, which is a range of the surrounding pixels, is 5×5 is illustrated.

As illustrated in FIG. 20B, when the median filter is applied to the white reference plate, the local noise as seen in FIG. 20A can be removed without affecting an edge or the like of the sample to be evaluated. As a result, it is possible to reduce noise of a spectral reflectance to be calculated by performing the normalization in the subsequent step.

The spectral image of the white plate is corrected in advance to prevent occurrence of the phenomenon that the abnormal value is calculated as the spectral reflectance when the spectral image of the white plate contains the noise and the image is used for normalization.

In this manner, even when there are dirt and deposits on the white plate as filtering is performed so that the local noise is present, it is possible to reduce the local luminance variation and to prevent the value of the measured spectral reflectance from taking the abnormal value.

The spectral images of the sample to be evaluated with the plurality of illuminations are normalized using the pixel values of the reference sample at the same illumination angle in all the above—described embodiments and adjustment examples. Thus, the spectral reflectance of the sample to be evaluated does not vary from the original value even when the illumination angle is changed, and it is possible to acquire the proper spectral reflectance image.

Although the color measurement apparatus in which the illuminator, the imager, and the color calculator are unitized as one device has been described in the above-described examples, the color calculator may be executed by a computing device such as a separate computer. In such a case, the computer or the like functions as the color information processing apparatus.

For example, the color information processing apparatus includes an input unit to which spectral images of a sample to be evaluated (measurement target) acquired at a plurality of predetermined illumination angles and spectral images of a reference sample (reference object) acquired at a plurality of illumination angles identical to the predetermined angles are input.

Further, the color information processing apparatus includes: a normalizer configured to normalize the spectral images of the measurement target acquired at the predetermined illumination angles using the spectral images of the reference object acquired at the same illumination angles, at each of the illumination angles; a generator configured to generate normalized spectral reflectance images of the measurement target; and a calculator configured to calculate a numerical value of at least one color for each pixel of the normalized spectral reflectance images of the measurement target at the respective illumination angles, which is similar to the color calculator including the above-described information processing device of FIG. 5.

A color measurement system may be provided by combining such a color information processing apparatus with the illuminators and imagers as illustrated in FIGS. 3, 11, 12, and 14.

Although the preferred embodiments of the invention have been described in detail above, the invention is not limited to such specific embodiments, and various modifications and changes can be made within the scope of the gist of the embodiment of the invention described in the claims.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A color measurement apparatus, comprising:
at least one illuminator configured to irradiate a surface of a measurement target and a surface of a reference object with light at a plurality of illumination angles;
an imager configured to image the surface of the measurement target at a predetermined capturing angle, at one illumination angle per imaging, to acquire spectral reflectance images of the measurement target at the plurality of illumination angles, and image the surface of the reference object at the predetermined capturing angle, at the plurality of illumination angles, respectively, to acquire spectral reflectance images of the reference object at the plurality of illumination angles; and
circuitry configured to:
normalize each pixel included in an imaging region of one of the spectral reflectance images of the measurement target irradiated with light at a specific illumination angle of the plurality of illumination angles, with one of the spectral reflectance images of the reference object irradiated with light at the specific illumination angle, for each of the plurality of illumination angles so as to generate normalized spectral reflectance images of the measurement target; and
calculate a numerical value of at least one color for each pixel of the normalized spectral reflectance images of the measurement target, for respective ones of the plurality of illumination angles, to measure color of the surface of the measurement target.

2. The color measurement apparatus according to claim 1, wherein
the imager is further configured to acquire the respective pixels included in the imaging region in a desired visible light wavelength when imaging the surface of the measurement target, the respective pixels being acquired for each wavelength band of the desired visible light wavelength divided into a predetermined number of bands, and collectively acquire the respective pixels in an imaging region in the desired visible light wavelength when imaging the surface of the reference object, and
the circuitry is further configured to normalize information on the respective pixels of the spectral reflectance images of the measurement target using information on the respective pixels of the spectral reflectance images of the reference object.

3. The color measurement apparatus according to claim 2, wherein
the illuminator is further configured to move a position to successively change the illumination angle.

4. The color measurement apparatus according to claim 1, wherein
the imager is further configured to acquire the respective pixels included in the imaging region in a desired visible light wavelength when imaging the surface of the measurement target, the respective pixels being acquired for each wavelength band of the desired visible light wavelength divided into a predetermined number of bands, and acquire the respective pixels included in an imaging region for each of wavelength bands divided into the predetermined number of bands within the desired visible light wavelength when imaging the surface of the reference object, and
the circuitry is further configured to normalize information on the respective pixels of the spectral reflectance images of the measurement target in the respective wavelength bands using information on the respective pixels of the spectral reflectance images of the reference object in the respective wavelength bands.

5. The color measurement apparatus according to claim 1, wherein
the imager is further configured to perform imaging in a visible light wavelength region of at least a wavelength of 380 nm to 780 nm, to acquire the spectral reflectance images of the measurement target and the spectral reflectance images of the reference object corresponding to the wavelength of 380 nm to 780 nm.

6. The color measurement apparatus according to claim 1, wherein
the imager is one of a multispectral camera and a hyperspectral camera configured to image a spectral reflectance image in at least eight or more wavelength bands.

7. The color measurement apparatus according to claim 1, wherein
the reference object is a white reference plate.

8. The color measurement apparatus according to claim 7, wherein
the numerical value of the color indicating the color of the surface of the measurement target is at least one of a value of a tristimulus value XYZ color system and a value of an L*a*b* color system calculated using a spectral distribution under an observation illumination condition to be desirably evaluated based on information on the respective pixels of the normalized spectral reflectance images of the measurement target.

9. The color measurement apparatus according to claim 8, wherein
the circuitry is further configured to calculate a correction value representing a variation from a reference value of a two-dimensional image with respect to the two-dimensional image indicating any color information of either tristimulus values XYZ or L*a*b* values calculated from the spectral reflectance image of the measurement target, and use the correction value to perform color correction of the two-dimensional image.

10. The color measurement apparatus according to claim 8, wherein
the circuitry is further configured to use a measured result obtained by blocking light from entering the imager to perform black calibration.

11. The color measurement apparatus according to claim 8, wherein
the imager is further configured to make an exposure time t1 when imaging the measurement target and an exposure time t2 when imaging the reference object different from each other such that exposure time t1 is greater than the exposure time t2.

12. The color measurement apparatus according to claim 11, wherein
the circuitry is further configured to normalize pixel values of the spectral reflectance image of the measurement target captured with the exposure time t1 and the spectral reflectance image of the reference object captured with the exposure time t2 using the spectral reflectance image of the reference object corrected based on the exposure times t1 and t2.

13. The color measurement apparatus according to claim 7, wherein the circuitry is further configured to perform white plate noise reduction correction by imaging processing on the spectral reflectance image of the white reference plate before performing normalization.

14. The color measurement apparatus according to claim 13, wherein
the white plate noise reduction correction includes filtering.

15. The color measurement apparatus according to claim 1, wherein
the imager is further configured to move a position to successively change the capturing angle.

16. A color measurement apparatus, comprising:
an illuminator configured to irradiate a surface of a measurement target and a surface of a reference object with light at a predetermined illumination angle;
at least one imager configured to image the surface of the measurement target at a plurality of capturing angles to acquire spectral reflectance images of the measurement target, and image the surface of the reference object at the plurality of capturing angles, at the predetermined illumination angle, to acquire spectral reflectance images of the reference object at the plurality of capturing angles; and
circuitry configured to:
normalize each pixel included in an imaging region of one of the spectral reflectance images of the measurement target captured at a specific capturing angle of the plurality of capturing angles, with one of the spectral reflectance images of the reference object captured at the specific capturing angle, for each of the plurality of capturing angles so as to generate normalized spectral reflectance images of the measurement target; and
calculate a numerical value of at least one color for each pixel of the normalized spectral reflectance images of the measurement target for respective ones of the plurality of capturing angles, to measure color of the surface of the measurement target.

17. A color information processing apparatus, comprising:
a memory; and
circuitry to:
input, to the memory, spectral reflectance images of a measurement target acquired at a plurality of predetermined illumination angles and spectral reflectance images of a reference object acquired at the plurality of predetermined angles;
normalize the spectral reflectance images of the measurement target acquired at the predetermined illumination angles using the spectral reflectance images of the reference object acquired at the same illumination angles, at each of the illumination angles, to generate normalized spectral reflectance images of the measurement target; and
calculate a numerical value of at least one color for each pixel of the normalized spectral reflectance images of the measurement target at the respective illumination angles.

* * * * *